(12) United States Patent
Li et al.

(10) Patent No.: US 12,126,989 B2
(45) Date of Patent: Oct. 22, 2024

(54) CELL CONFIGURATION APPARATUS AND METHOD

(71) Applicant: FUJITSU LIMITED, Kawasaki (JP)

(72) Inventors: Guorong Li, Beijing (CN); Yulong Shi, Beijing (CN); Lei Zhang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/908,090

(22) Filed: Jun. 22, 2020

(65) Prior Publication Data

US 2020/0329415 A1 Oct. 15, 2020

Related U.S. Application Data

(63) Continuation of application No. PCT/CN2018/076304, filed on Feb. 11, 2018.

(51) Int. Cl.
*H04W 36/28* (2009.01)
*H04W 36/00* (2009.01)
(Continued)

(52) U.S. Cl.
CPC ..... *H04W 36/0061* (2013.01); *H04W 36/087* (2023.05); *H04W 36/304* (2023.05); *H04W 36/362* (2023.05); *H04W 36/0069* (2018.08)

(58) Field of Classification Search
CPC . H04W 36/28; H04W 36/0061; H04W 36/08; H04W 36/30; H04W 36/00837; H04W 36/0058; H04W 36/00835
See application file for complete search history.

(56) References Cited

U.S. PATENT DOCUMENTS

2011/0149913 A1 6/2011 Park et al.
2012/0088507 A1* 4/2012 Legg ................ H04W 36/245
455/436
(Continued)

FOREIGN PATENT DOCUMENTS

CN 102026264 A 4/2011
CN 102378287 A 3/2012
(Continued)

OTHER PUBLICATIONS

International Search Report issued by the State Intellectual Property Office of the P.R. China for corresponding International Patent Application No. PCT/CN2018/076304, mailed on Nov. 5, 2018, with an English translation.
(Continued)

*Primary Examiner* — Barry W Taylor
(74) *Attorney, Agent, or Firm* — Myers Wolin, LLC

(57) ABSTRACT

A cell configuration apparatus and method. By receiving configuration information on candidate cells from the network device at the source side, when a candidate cell satisfies a condition for performing conditional handover, a target primary cell and target secondary cells are configured according to the configuration information; or, when or after handover is completed, information on cells having best quality or indication of the information on cells having best quality is transmitted to a network device at the target side, configuration information on target secondary cells is received from the second network device, and the target secondary cells are configured according to the configuration information.

15 Claims, 21 Drawing Sheets

(51) Int. Cl.
*H04W 36/08* (2009.01)
*H04W 36/30* (2009.01)
*H04W 36/36* (2009.01)

(56) References Cited

U.S. PATENT DOCUMENTS

| | | | | |
|---|---|---|---|---|
| 2012/0302245 | A1* | 11/2012 | Huang | H04W 36/0027 |
| | | | | 455/438 |
| 2013/0165115 | A1 | 6/2013 | Jung et al. | |
| 2013/0165124 | A1* | 6/2013 | Liang | H04W 36/0061 |
| | | | | 455/437 |
| 2013/0183970 | A1* | 7/2013 | Chen | H04W 36/30 |
| | | | | 455/436 |
| 2013/0336153 | A1 | 12/2013 | Liang | |
| 2014/0126545 | A1 | 5/2014 | Tamura et al. | |
| 2014/0192771 | A1* | 7/2014 | Jung | H04W 36/08 |
| | | | | 370/331 |
| 2016/0150458 | A1 | 5/2016 | Wang et al. | |
| 2018/0097578 | A1 | 4/2018 | Li et al. | |
| 2018/0227805 | A1* | 8/2018 | Jang | H04W 72/1215 |
| 2019/0223073 | A1* | 7/2019 | Chen | H04W 36/0058 |
| 2019/0246323 | A1* | 8/2019 | Kim | H04W 36/0085 |
| 2019/0281511 | A1* | 9/2019 | Susitaival | H04W 36/0016 |
| 2019/0349819 | A1* | 11/2019 | Xu | H04W 36/0033 |
| 2019/0387440 | A1* | 12/2019 | Yiu | H04W 36/32 |
| 2020/0045602 | A1* | 2/2020 | Jiang | H04W 36/0079 |
| 2020/0314914 | A1* | 10/2020 | Roy | H04W 74/006 |
| 2020/0396660 | A1* | 12/2020 | Wu | H04W 76/27 |
| 2021/0051542 | A1* | 2/2021 | Jokela | H04W 36/0061 |
| 2021/0120458 | A1* | 4/2021 | Koskela | H04W 36/0016 |
| 2022/0279412 | A1* | 9/2022 | Wu | H04W 36/362 |

FOREIGN PATENT DOCUMENTS

| | | | |
|---|---|---|---|
| CN | 103906147 | * | 7/2014 |
| CN | 103906147 A | | 7/2014 |
| CN | 104581810 A | | 4/2015 |
| CN | 107113673 A | | 8/2017 |
| CN | 107211295 A | | 9/2017 |
| CN | 107683576 A | | 2/2018 |
| JP | 2012-70134 A | | 4/2012 |
| JP | 2013-524585 A | | 6/2013 |
| JP | 2013-543671 A | | 12/2013 |
| JP | 2016-529804 A | | 9/2016 |

OTHER PUBLICATIONS

Written Opinion of the International Searching Authority issued by the State Intellectual Property Office of the P.R. China for corresponding International Patent Application No. PCT/CN2018/076304, mailed on Nov. 5, 2018, with an English translation.

Notice of Reasons for Refusal issued by the Japan Patent Office for corresponding Japanese Patent Application No. 2020-536648, mailed on Aug. 31, 2021, with an English translation.

First Notification of Office Action and Search Report issued by the China National Intellectual Property Administration for corresponding Chinese Patent Application No. 201880084276.9, dated Oct. 28, 2021, with an English translation.

ETSI MCC, "Report of 3GPP TSG RAN WG2 meeting #94, Nanjing, China, May 23-27, 2016", Agenda Item: 2.2, 3GPP TSG-RAN Working Group 2 meeting #95, R2-164670, Gothenburg, Sweden, Aug. 23-26, 2016.

Second Notification of Office Action issued by the China National Intellectual Property Administration for corresponding Chinese Patent Application No. 201880084276.9, dated May 20, 2022, with an English translation.

Notice of Reasons for Refusal issued by the Japan Patent Office for corresponding Japanese Patent Application No. 2021-204514, mailed on Jan. 4, 2023, with an English translation.

* cited by examiner

CELL CONFIGURATION APPARATUS AND METHOD

CROSS REFERENCE TO RELATED APPLICATIONS

This application is a continuation application of International Application No. PCT/CN2018/076304, filed on Feb. 11, 2018, the contents of which are incorporated herein by reference.

TECHNICAL FIELD

This disclosure relates to the field of communication technologies, and in particular to a cell configuration apparatus and method.

BACKGROUND

Issues related to next-generation wireless communications systems are under study in 3GPP (3rd Generation Partnership Project). In a next-generation wireless communications system, such as a new radio (NR) system, in some deployments and scenarios, such as in handover of a cell, transmission of radio resource control (RRC) signaling at a source side may possibly fail because a user equipment (UE) has moved into coverage of handover target cell, thereby increasing rate of failure of handover.

In order to avoid poor radio link quality of a serving cell at a moment when a UE should perform handover, it should be possible to provide RRC signaling to the UE earlier. For this reason, in an NR system, a handover command may be associated with a certain condition, and when the condition is satisfied, the UE may perform handover according to the provided handover command. Such handover is referred to as conditional handover (HO).

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that regarding a problem of how to perform cell configuration in conditional handover, only a case where a UE has one serving cell is currently concerned. In some scenarios, such as in a scenario where carrier aggregation (CA) is applied, the UE may have multiple serving cells including a primary cell (Pcell) and secondary cells (Scells). In performing cell handover in this scenario, the UE reports a quality measurement result of the best-quality cell on each frequency to a network device at a source side in a quality measurement report. After receiving the quality measurement report, the network device at the source side may decide to initiate handover and transfer handover preparation to a network device at a target side; wherein the network device at the source side contains the quality measurement result of the best-quality cell on each frequency reported by the UE in a candidate cell information list IE (CandidateCellInfoList IE) in a transmitted radio resource management configuration (RRM-config) message, the network device at the target side may select a target PCell and target Scells for the UE according to the quality measurement result, and the network device at the target side may include configuration of the target PCell and target Scells in a handover command transmitted to the UE, for use by the UE in performing configuration on the target PCell and target Scells. However, currently, there exists no efficient method for performing cell configuration in a case where a UE may have multiple serving cells during conditional handover.

Embodiments of this disclosure provide a cell configuration apparatus and method, in which in a case where the UE may have multiple serving cells in conditional handover, configuration may be performed effectively on cells including target secondary cells. Thus, during the handover process, the target secondary cells may be configured for the UE as fast as possible, influence of the data transmission rate on the UE during the handover process may be reduced, and user experiences may be improved.

According to a first aspect of the embodiments of this disclosure, there is provided a cell configuration apparatus, including: a first receiving unit configured to receive configuration information on candidate cells from a first network device; and a first configuring unit configured to, when a candidate cell satisfies a condition for performing conditional handover, configure a target primary cell (PCell) and target secondary cells (SCells) according to the configuration information.

According to a second aspect of the embodiments of this disclosure, there is provided a cell configuration apparatus, including: a second transmitting unit configured to transmit information on cells having best quality or indication of the information on cells having best quality to a second network device when or after handover is completed; a fourth receiving unit configured to receive configuration information on target secondary cells from the second network device; and a fourteenth configuring unit configured to configure the target secondary cells according to the configuration information.

According to a third aspect of the embodiments of this disclosure, there is provided a cell configuration apparatus, including: a sixth transmitting unit configured to transmit configuration information on candidate cells used for configuring a target primary cell and target secondary cells to a first network device.

According to a fourth aspect of the embodiments of this disclosure, there is provided a cell configuration apparatus, including: an eleventh transmitting unit configured to transmit configuration information on candidate cells used for configuring a target primary cell and target secondary cells.

According to a fifth aspect of the embodiments of this disclosure, there is provided a user equipment, including the apparatus as described in the first or second aspect of the embodiments of this disclosure.

According to a sixth aspect of the embodiments of this disclosure, there is provided a network device, including the apparatus as described in the third or fourth aspect of the embodiments of this disclosure.

According to a seventh aspect of the embodiments of this disclosure, there is provided a communications system, the communications system including: a user equipment, including the apparatus as described in the first or second aspect of the embodiments of this disclosure; and/or, a first network device, including the apparatus as described in the third aspect of the embodiments of this disclosure; and a second network device, including the apparatus as described in the fourth aspect of the embodiments of this disclosure According to a ninth aspect of the embodiments of this disclosure, there is provided a cell configuration method, including: receiving configuration information on candidate cells from a first network device; and when a candidate cell satisfies a condition for performing conditional handover, configuring a target primary cell and target secondary cells according to the configuration information.

According to a tenth aspect of the embodiments of this disclosure, there is provided a cell configuration method, including: transmitting information on cells having best quality or indication of the information on cells having best quality to a second network device when or after handover is completed; receiving configuration information on target secondary cells from the second network device; and configuring the target secondary cells according to the configuration information.

According to an eleventh aspect of the embodiments of this disclosure, there is provided a cell configuration method, including: transmitting configuration information on candidate cells used for configuring a target primary cell and target secondary cells to a first network device.

According to a twelfth aspect of the embodiments of this disclosure, there is provided a cell configuration apparatus, including: transmitting configuration information on candidate cells used for configuring a target primary cell and target secondary cells to a user equipment.

According to a thirteenth aspect of the embodiments of this disclosure, there is provided a computer readable program code, which, when executed in a cell configuration apparatus or a user equipment, will cause the cell configuration apparatus or the user equipment to carry out the cell configuration method as described in the ninth or tenth aspect of the embodiments of this disclosure.

According to a fourteenth aspect of the embodiments of this disclosure, there is provided a computer storage medium, including a computer readable program code, which will cause a cell configuration apparatus or a user equipment to carry out the cell configuration method as described in the ninth or tenth aspect of the embodiments of this disclosure.

According to a fifteenth aspect of the embodiments of this disclosure, there is provided a computer readable program code, which, when executed in a cell configuration apparatus or a network device, will cause the cell configuration apparatus or the network device to carry out the cell configuration method as described in the eleventh or twelfth aspect of the embodiments of this disclosure.

According to a sixteenth aspect of the embodiments of this disclosure, there is provided a computer storage medium, including a computer readable program code, which will cause a cell configuration apparatus or a network device to carry out the cell configuration method as described in the eleventh or twelfth aspect of the embodiments of this disclosure.

An advantage of the embodiments of this disclosure exists in that by receiving configuration information on candidate cells from the network device at the source side, when a candidate cell satisfies a condition for performing conditional handover, a target primary cell and target secondary cells are configured according to the configuration information; or, when or after handover is completed, information on cells having best quality or indication of the information on cells having best quality is transmitted to a network device at the target side, configuration information on target secondary cells is received from the second network device, and the target secondary cells are configured according to the configuration information. Hence, in a case where the UE may have multiple serving cells in conditional handover, configuration may be performed effectively on cells including target secondary cells. Thus, during the handover process, the target secondary cells may be configured for the UE as fast as possible, influence of the data transmission rate on the UE during the handover process may be reduced, and user experiences may be improved.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
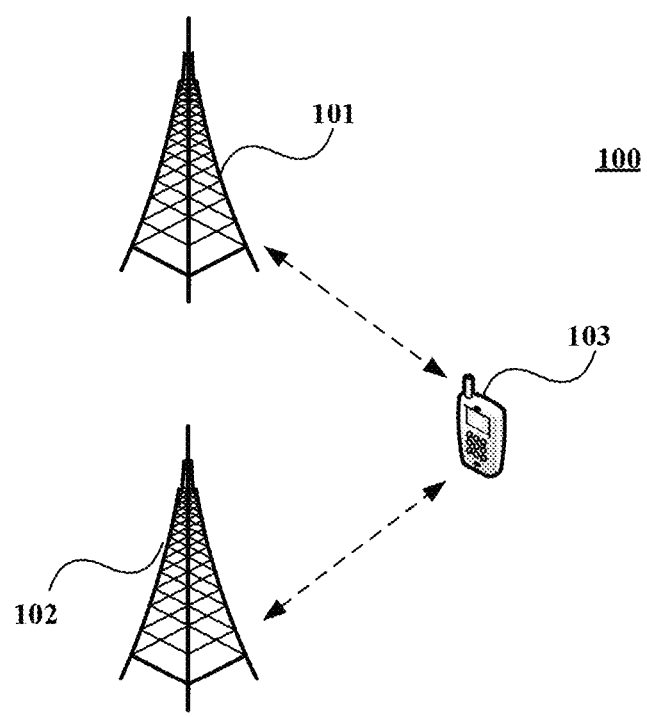
FIG. 1 is a schematic diagram of a communications system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, "multiple" or "a plurality of" refers to "at least two".

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communications system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communications system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

In the embodiments of this disclosure, the base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

In the embodiments of this disclosure, the user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal.

Scenarios in the embodiments of this disclosure shall be described below by way of examples; however, this disclosure is not limited thereto.

FIG. 1 is a schematic diagram of a communications system of an embodiment of this disclosure, in which a case where a user equipment and network devices are taken as examples is schematically shown. As shown in FIG. 1, a communications system 100 may include a first network device 101, a second network device 102 and a user equipment 103.

In the embodiment of this disclosure, existing services or services that may be implemented in the future may be performed between the first network device 101, the second network device 102 and the user equipment 103. For example, such services may include but not limited to an enhanced mobile broadband (eMBB), massive machine type communication (MTC), and ultra-reliable and low-latency communication (URLLC), etc.

For example, the user equipment 103 performs cell handover, the first network device 101 is a network device at a source side, and the second network device 102 is a network device at a target side.

In the embodiments of this disclosure, "the first network device" is a network device at a source side where handover is performed, and "the second network device" is a network device at a target side where handover is performed.

Embodiment 1

Figure 2:
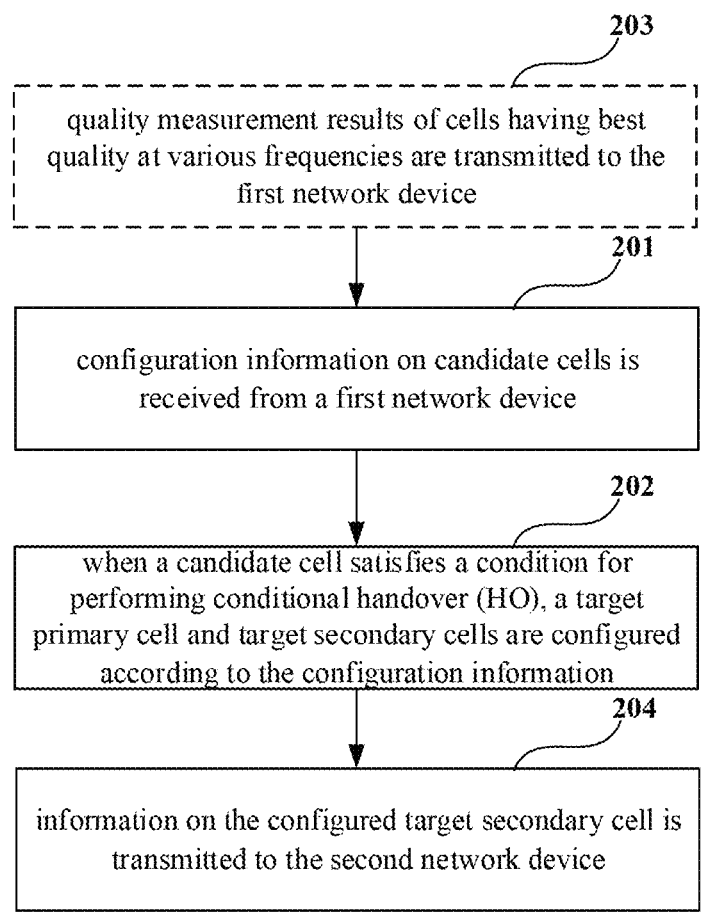
FIG. 2 is a schematic diagram of the cell configuration method of Embodiment 1 of this disclosure.

Embodiment 1 of this disclosure provides a cell configuration method, applicable to a user equipment side. FIG. 2 is a schematic diagram of the cell configuration method of Embodiment 1 of this disclosure. As shown in FIG. 2, the method includes:

Step 201: configuration information on candidate cells is received from a first network device; and Step 202: when a candidate cell satisfies a condition for performing conditional handover (HO), a target primary cell and target secondary cells are configured according to the configuration information.

It can be seen from the above embodiment that by receiving configuration information on candidate cells from the network device at the source side, when a candidate cell satisfies a condition for performing conditional handover, a target primary cell and target secondary cells are configured according to the configuration information. Hence, in a case where the UE may have multiple serving cells in conditional handover, configuration may be performed effectively on cells including target secondary cells. Thus, during the handover process, the target secondary cells may be configured for the UE as fast as possible, influence of the data transmission rate on the UE during the handover process may be reduced, and user experiences may be improved.

In this embodiment, the first network device may be a network device at a source side where handover is performed.

For example, before step 201, the method may further include:

Step 203: quality measurement results of cells having best quality at various frequencies are transmitted to the first network device.

In this embodiment, step 203 is optional.

For example, when the quality measurement results are lower than a preset threshold, step 203 is executed. The preset threshold may be set as actually demanded, and may be set to be of a relatively low value.

In this embodiment, the quality measurement results are used to evaluate communication quality of the cells. For example, the quality measurement results may be at least one of reference signal receiving power (RSRP), reference signal receiving quality (RSRQ) and a signal to interference plus noise ratio (SINR).

In this embodiment, the frequencies may be predefined or preconfigured, and may be determined as actually demanded.

For example, the quality measurement result may be transmitted in a form of an early report. After receiving the early report from the user equipment, the first network device decides whether to perform handover (HO) according to the early report. When the first network device decides to perform handover, it may determine a network device to which the cell belongs according to information on the cells having the best quality (such as ID information), and determine the network device as a network device at a target side of the handover, which is also referred to as "a second network device" in the embodiments of this disclosure. Thereafter, the first network device transmits an HO request including a cell information list to the second network device, the cell information list being obtained according to the quality measurement result. The second network device generates configuration information on candidate cells according to the received HO request and transmits the information to the first network device, and the first network device transmits a conditional HO command containing configuration information on the candidate cells to the user equipment.

In this embodiment, the preset threshold may be a relatively high value, for example, it may be higher than the above preset threshold value triggering step 203. Hence, in step 201, the configuration information on the candidate cells is received from the first network device.

In this embodiment, the receiving configuration information on candidate cells from the first network device may include, for example, receiving information on the candidate cells and a condition for performing conditional handover from the first network device.

For example, the information on the candidate cells refers to information on candidate cells that may be configured as a primary cell and/or a secondary cell; for example, the information may include at least one of Global Cell Identifiers (GCIs), physical cell identifiers (PCIs), absolute radio frequency channel numbers (ARFCNs) and cell indices, of these candidate cells.

In this embodiment, for example, the condition for performing the conditional handover may be that aa candidate cell satisfies a condition that it is configured as the target primary cell. When a candidate cell satisfies this condition, start of the conditional handover is triggered.

In step 202, when a candidate cell satisfies the condition for performing conditional handover, the target primary cell and the target secondary cells are configured according to the configuration information.

For example, the user equipment may determine whether a candidate cell satisfies the handover condition according to the quality measurement results of the candidate cells. When the quality measurement results of a candidate cell satisfy the condition, the candidate cells may be configured as the target primary cell or target secondary cell according to the information on the candidate cells.

In this embodiment, the method may further include:

Step 204: information on the configured target secondary cell is transmitted to the second network device.

In this embodiment, the information on the configured target secondary cell may include at least one of the following: a Global Cell Identifier (GCI), a physical cell identifier (PCI), an absolute radio frequency channel number (ARFCN) and a cell index, of the configured target secondary cell.

For example, the information on the configured target secondary cell is transmitted to the second network device in an HO complete message.

In this embodiment, completion of handover may refer to that configuration of the target primary cell and the target secondary cells is completed.

Figure 3:
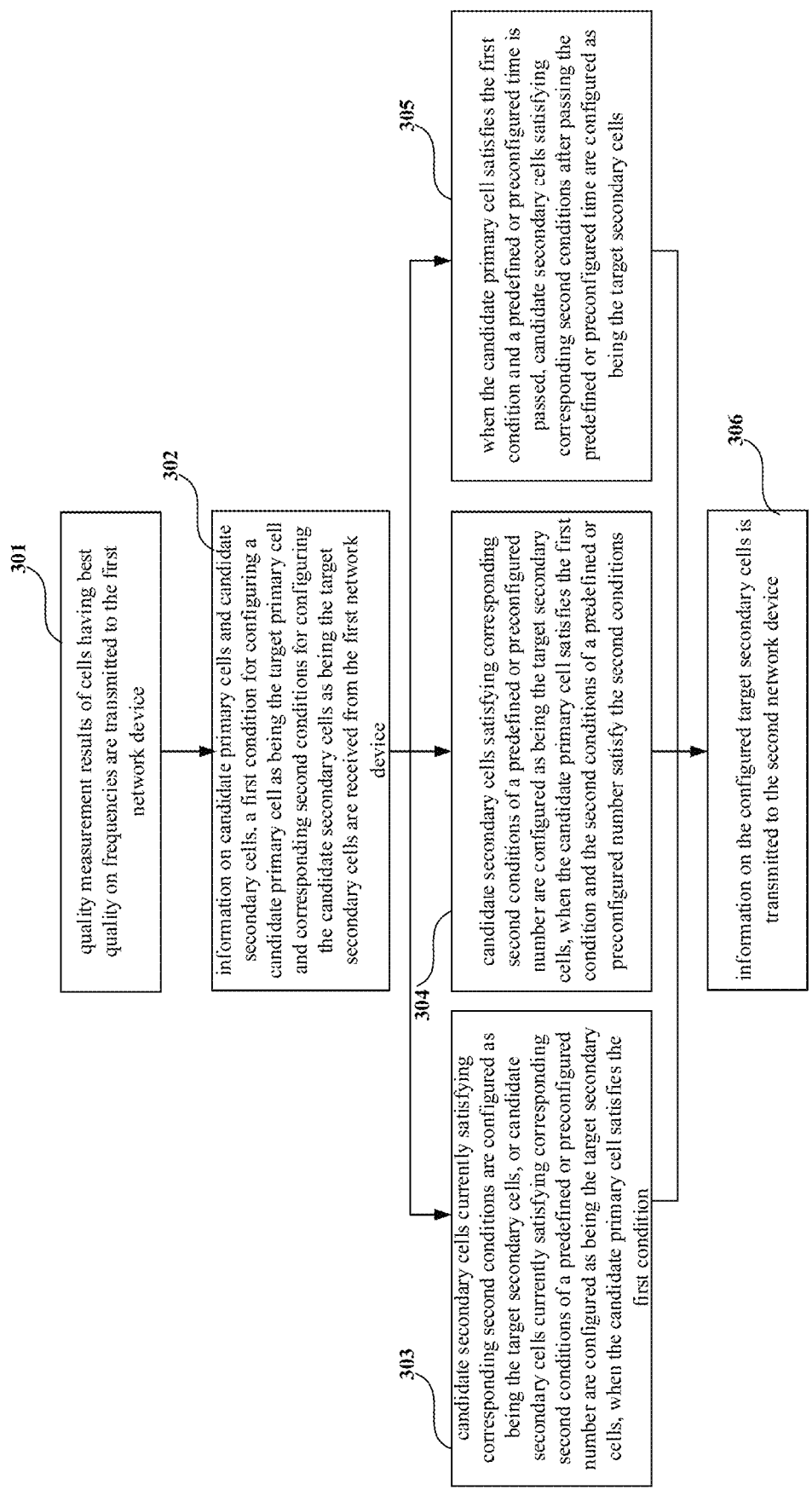
FIG. 3 is another schematic diagram of the cell configuration method of Embodiment 1 of this disclosure.

FIG. 3 is another schematic diagram of the cell configuration method of Embodiment 1 of this disclosure. As shown in FIG. 3, the method includes:

Step 301: quality measurement results of cells having best quality on frequencies are transmitted to the first network device;

Step 302: information on candidate primary cells and candidate secondary cells, a first condition for configuring a candidate primary cell as being the target primary cell and corresponding second conditions for configuring the candidate secondary cells as being the target secondary cells are received from the first network device; and at least one of the following steps 303-305:

Step 303: candidate secondary cells currently satisfying corresponding second conditions are configured as being the target secondary cells, or candidate secondary cells currently satisfying corresponding second conditions of a predefined or preconfigured number are configured as being the target secondary cells, when the candidate primary cell satisfies the first condition;

Step 304: candidate secondary cells satisfying corresponding second conditions of a predefined or preconfigured number are configured as being the target secondary cells, when the candidate primary cell satisfies the first condition and the second conditions of a predefined or preconfigured number satisfy the second conditions;

Step 305: when the candidate primary cell satisfies the first condition and a predefined or preconfigured time is passed, candidate secondary cells satisfying corresponding second conditions after passing the predefined or preconfigured time are configured as being the target secondary cells; and Step 306: information on the configured target secondary cells is transmitted to the second network device.

In this embodiment, step 301 may be similar to step 203 in FIG. 2, and shall not be described herein any further.

In this embodiment, the first condition may correspond to the "condition for performing conditional handover (HO)" in step 202.

In this embodiment, the first condition and the second conditions may be generated by the first network device, or may be generated by the second network device.

In this embodiment, the second conditions that the candidate secondary cells are configured as being the target secondary cells are commonly configured or respectively configured. That is, second conditions of two candidate secondary cells in the candidate secondary cells may be configured to be identical, or may be configured to be different.

In this embodiment, the first condition may be set as actually demanded. For example, the first condition may include at least one of the following conditions that: the user equipment detects out-of-step within a period of time after transmitting the quality measurement result, communication quality of the candidate primary cell is better than communication quality of a primary cell that is currently in service, and the number of beams of the candidate primary cell is larger than the number of beams of the primary cell that is currently in service.

In this embodiment, the second conditions may include at least one of the following conditions that: quality measurement results of the candidate secondary cells are higher than or equal to a predefined or preconfigured first threshold; quality measurement results of the candidate secondary cells are higher than or equal to a quality measurement result of a primary cell or secondary cell that is currently in service, and differences between the quality measurement results of the candidate secondary cells and the quality measurement result of the primary cell or secondary cell that is currently in service is higher than or equal to a predefined or preconfigured second threshold; and the number of beams of the candidate secondary cells is higher than or equal to a predefined or preconfigured third threshold.

In this embodiment, numerical values of the predefined or preconfigured first threshold, second threshold and third threshold may be determined as actually demanded.

In this embodiment, steps 303-305 may correspond to step 202 in FIG. 2.

In steps 303 and 304, the predefined or preconfigured number may be determined as actually demanded; for example, the predefined or preconfigured number is an integer higher than or equal to 1.

In step 305, the predefined or preconfigured time may be determined as actually demanded; for example, a timer may be preconfigured or predefined, and the timer is started when the candidate primary cell satisfies the first condition, and when the timer expires, the user equipment determines which candidate secondary cells satisfy the corresponding second condition, and configures candidate cells satisfying the second condition as the target secondary cells.

In this embodiment, step 306 may be similar to step 204 in FIG. 2, and shall not be described herein any further.

Figure 4:
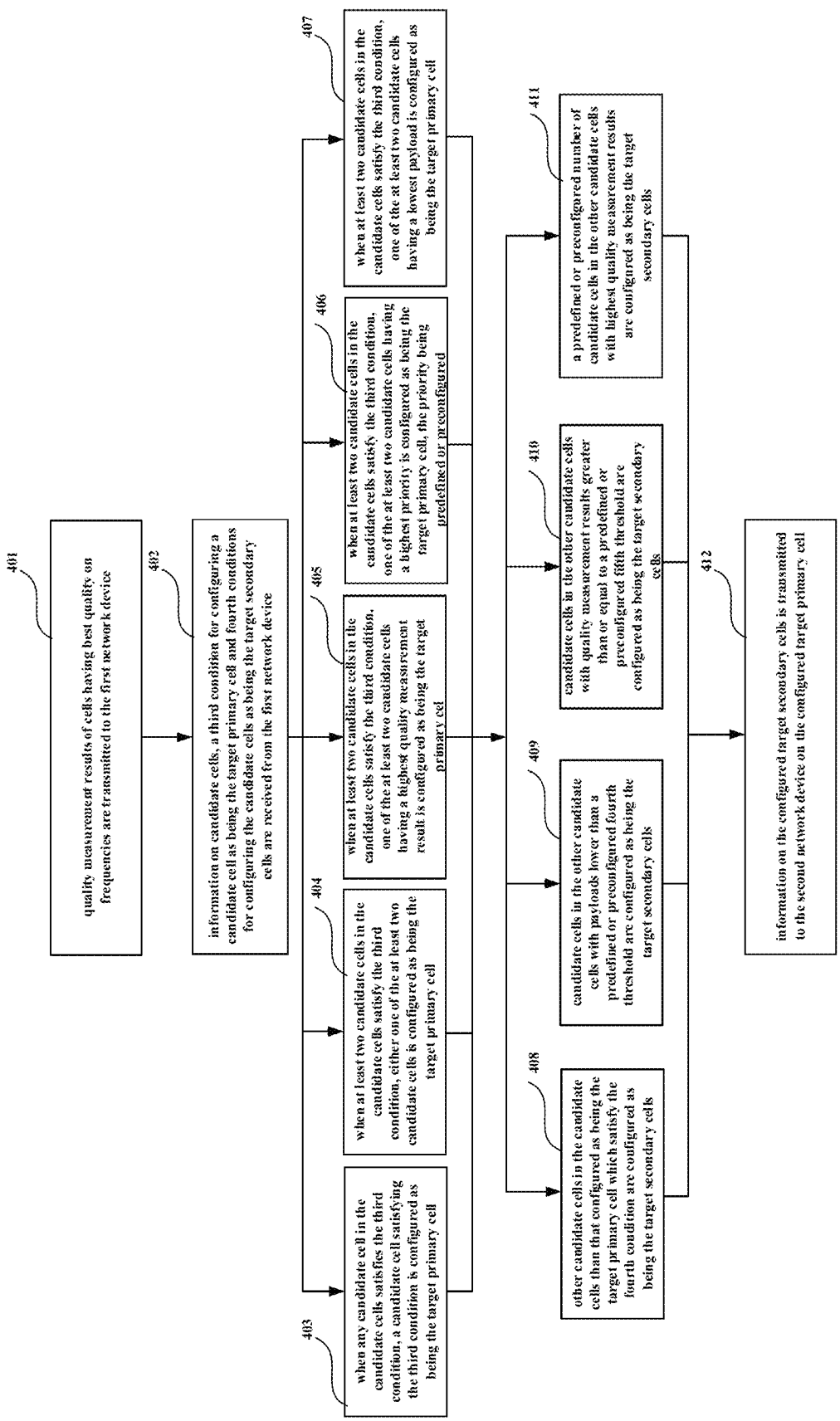
FIG. 4 is a further schematic diagram of the cell configuration method of Embodiment 1 of this disclosure.

FIG. 4 is a further schematic diagram of the cell configuration method of Embodiment 1 of this disclosure. As shown in FIG. 4, the method includes:

Step 401: quality measurement results of cells having best quality on frequencies are transmitted to the first network device;

Step 402: information on candidate cells, a third condition for configuring a candidate cell as being the target primary cell and fourth conditions for configuring the candidate cells as being the target secondary cells are received from the first network device; and at least one of the following steps 403-407:

Step 403: when one of the candidate cells satisfies the third condition, a candidate cell satisfying the third condition is configured as being the target primary cell;

Step 404: when at least two candidate cells in the candidate cells satisfy the third condition, either one of the at least two candidate cells is configured as being the target primary cell;

Step 405: when at least two candidate cells in the candidate cells satisfy the third condition, one of the at least two candidate cells having a highest quality measurement result is configured as being the target primary cell;

Step 406: when at least two candidate cells in the candidate cells satisfy the third condition, one of the at least two candidate cells having a highest priority is configured as being the target primary cell, the priority being predefined or preconfigured;

Step 407: when at least two candidate cells in the candidate cells satisfy the third condition, one of the at least two candidate cells having a lowest payload is configured as being the target primary cell; and at least one of the following steps 408-411:

Step 408: other candidate cells in the candidate cells than that configured as being the target primary cell which satisfy the fourth condition are configured as being the target secondary cells;

Step 409: candidate cells in the other candidate cells with payloads lower than a predefined or preconfigured fourth threshold are configured as being the target secondary cells;

Step 410: candidate cells in the other candidate cells with quality measurement results higher than or equal to a predefined or preconfigured fifth threshold are configured as being the target secondary cells;

Step 411: a predefined or preconfigured number of candidate cells in the other candidate cells with highest quality measurement results are configured as being the target secondary cells; and Step 412: information on the configured target secondary cells is transmitted to the second network device on the configured target primary cell.

In this embodiment, step 401 may be similar to step 203 in FIG. 2, which shall not be described herein any further.

In this embodiment, the third condition may correspond to the "condition for performing conditional handover (HO)" in step 202.

In step 402, the information on candidate cells and the third condition for configuring a candidate cells as being the target primary cell are received from the first network device, the third condition may be set as actually demanded.

For example, the third condition is identical to the first condition described above.

In this embodiment, the fourth condition may be set as actually demanded. For example, the fourth condition may be identical to or different from the third condition.

In this embodiment, numerical values of the predefined or preconfigured fourth threshold and fifth thresholds may be set as actually demanded.

In step 411, by transmitting the information on the configured target secondary cells on the configured target primary cell, the second network device may obtain information the target primary cell, and particular implementation of this step is similar to that of step 204 in FIG. 2, which shall not be described herein any further.

It can be seen from the above embodiment that by receiving configuration information on candidate cells from the network device at the source side, when a candidate cell satisfies a condition for performing conditional handover, a target primary cell and target secondary cells are configured according to the configuration information. Hence, in a case where the UE may have multiple serving cells in conditional handover, configuration may be performed effectively on cells including target secondary cells. Thus, during the handover process, the target secondary cells may be configured for the UE as fast as possible, influence of the data transmission rate on the UE during the handover process may be reduced, and user experiences may be improved.

Embodiment 2

Figure 5:
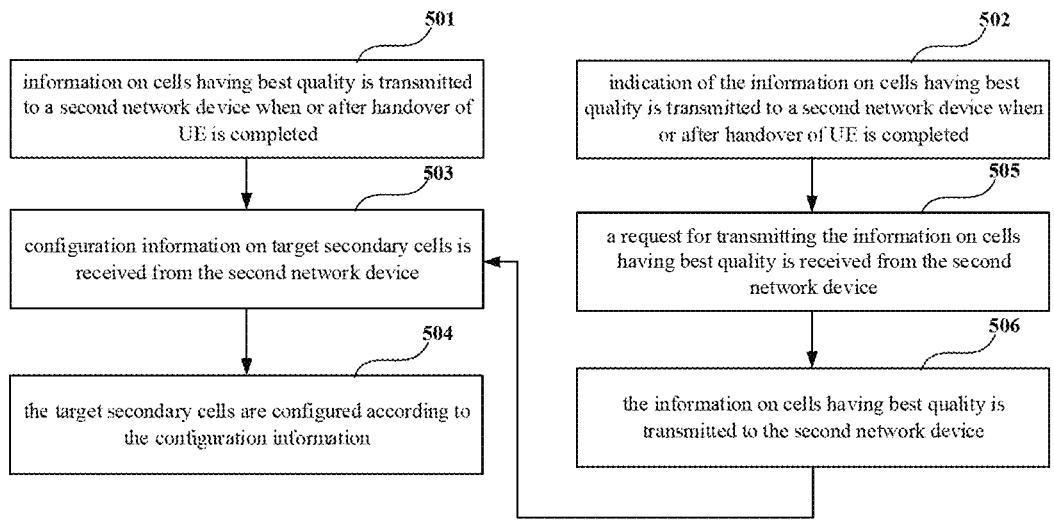
FIG. 5 is a schematic diagram of the cell configuration method of Embodiment 2 of this disclosure.

Embodiment 2 of this disclosure provides a cell configuration method, applicable to a user equipment side. FIG. 5 is a schematic diagram of the cell configuration method of Embodiment 2 of this disclosure. As shown in FIG. 5, the method includes:

Step 501: information on cells having best quality is transmitted to a second network device when or after handover is completed; or Step 502: indication of the information on cells having best quality is transmitted to a second network device when or after handover is completed;

Step 503: configuration information on target secondary cells is received from the second network device; and Step 504: the target secondary cells are configured according to the configuration information.

In this embodiment, completion of handover may refer to that configuration of the target primary cell is completed by the user equipment. And reference may be made to relevant techniques for a method for configuring the primary cell by the user equipment, which shall not be described herein any further.

In step 501, the user equipment may transmit the information on cells having best quality to the second network device when the handover of the UE is completed.

For example, the information on cells having best quality or indication of the information on cells having best quality is transmitted to the second network device in an HO complete message. The information on cells having best quality may include quality measurement results and/or IDs and/or frequencies of cells having best quality on the frequencies. As transmitting the handover complete message is a last step of handover completion in this embodiment, it is equivalent to transmitting the information on the cells having best quality at the moment when the handover is completed.

In step 501, the user equipment may also transmit the information on cells having best quality to the second network device after the handover of the UE is completed.

For example, after the handover complete message is transmitted to the second network device, the information on cells having best quality may be transmitted to the second network device.

For example, the information on cells having best quality may be represented in a form of a cell information list.

For example, the information on cells having best quality may include quality measurement results of cells having best quality on the frequencies.

In this embodiment, the quality measurement results included in the information on cells having best quality are used to evaluate communication quality of the cells. For example, the quality measurement results may be at least one of reference signal receiving power (RSRP), reference signal receiving quality (RSRQ) and a signal to interference plus noise ratio (SINR).

In this embodiment, the frequencies may be predefined or pre-configured, which may be determined as actually demanded.

In this embodiment, the second network device may be a network device at a target side where handover is performed.

In this embodiment, reference may be made to step 501 for particular implementation of step 502, which shall not be described herein any further.

In this embodiment, the indication of the information on cells having best quality may be an indication that the user equipment interrogates whether the second network needs to be provided with the information on cells having best quality.

In this embodiment, when the indication of the information on cells having best quality is transmitted to the second network device in step 502, before step 503, the method may further include:

Step 505: a request for transmitting the information on cells having best quality is received from the second network device; and Step 506: the information on cells having best quality is transmitted to the second network device.

In this embodiment, steps 505 and 506 are optional.

In this way, the indication of the information on cells having best quality is transmitted first rather than directly transmitting the information on cells having best quality, and the information on cells having best quality is transmitted upon request by the second network device, thereby lowering overhead of the handover complete message.

In this embodiment, after receiving the information on cells having best quality, the second network device generates configuration information on the target secondary cells and transmits it to the user equipment.

In step 503, the user equipment receives configuration information on the target secondary cells from the second network device, and performs configuration of the target secondary cells according to the configuration information in step 504.

In this embodiment, the configuration information on the target secondary cells may include, for example, at least one of Global Cell Identifiers (GCIs), physical cell identifiers (PCIs), absolute radio frequency channel numbers (ARFCNs) and cell indices, of the target secondary cells.

It can be seen from the above embodiment that by transmitting the information on cells having best quality or indication of the information on cells having best quality to a network device at the target side when or after handover is completed, receiving the configuration information on target secondary cells from the second network device and configuring the target secondary cells according to the configuration information, in a case where the UE may have multiple serving cells in conditional handover, configuration may be performed effectively on cells including target secondary cells. Thus, during the handover process, the target secondary cells may be configured for the UE as fast as possible, influence of the data transmission rate on the UE during the handover process may be reduced, and user experiences may be improved.

Embodiment 3

Embodiment 3 of this disclosure provides a cell configuration method, applicable to a network device side, particularly applicable to a network device side taken as a target side of handover, i.e. a second network device side. This method corresponds to the cell configuration method applicable to a user equipment side in Embodiment 1, and reference may be made to what is contained in Embodiment 1 for identical contents.

Figure 6:
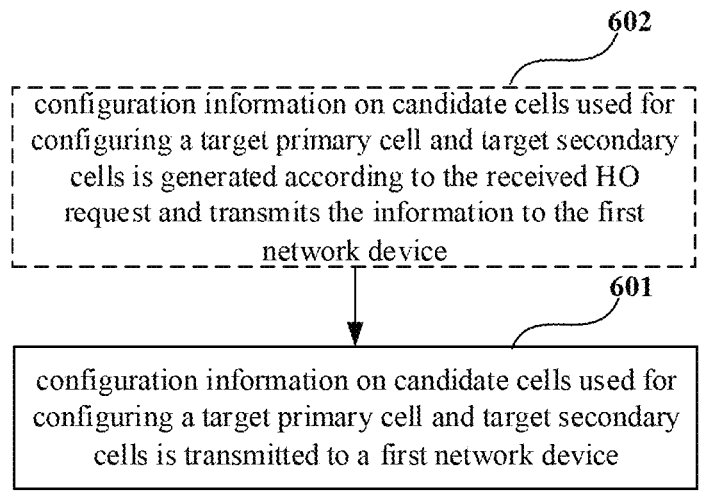
FIG. 6 is a schematic diagram of the cell configuration method of Embodiment 3 of this disclosure.

FIG. 6 is a schematic diagram of the cell configuration method of Embodiment 3 of this disclosure. As shown in FIG. 6, the method includes:

Step 601: configuration information on candidate cells used for configuring a target primary cell and target secondary cells is transmitted to a first network device.

For example, the user equipment transmits quality measurement results of cells having best quality on frequencies to the first network device that is the network device on the source side in a form of an early report. After receiving the early report from the user equipment, the first network device decides whether to perform conditional handover (HO) according to the early report. When the first network device decides to perform conditional handover, it may determine a network device to which the cell belongs according to information on the cells having the best quality (such as ID information), and determine the network device as a network device at a target side of the handover, i.e. the second network device. Thereafter, the first network device transmits an HO request including a cell information list to the second network device, so that before step 601, the method may further include:

Step 602: configuration information on candidate cells used for configuring a target primary cell and target secondary cells is generated according to the received HO request and transmits the information to the first network device.

In this embodiment, corresponding to step 302 in FIG. 3, in step 601, it may be that the information on the candidate primary cell and the candidate secondary cells is transmitted to the first network device, or the information on the candidate primary cell and the candidate secondary cells, a first condition for configuring a candidate primary cell as being the target primary cell and corresponding second conditions for configuring the candidate secondary cells as being the target secondary cells are transmitted to the first network device.

In this embodiment, corresponding to step 402 in FIG. 4, in step 601, it may be that the information on the candidate cell is transmitted to the first network device, or the information on the candidate cell, a third condition for configuring a candidate primary cell as being the target primary cell and fourth conditions for configuring the candidate cells as being the target secondary cells are transmitted to the first network device.

It can be seen from the above embodiment that by transmitting configuration information on candidate cells used for configuring the target primary cell and the target secondary cells, in a case where the UE may have multiple serving cells in conditional handover, configuration may be performed effectively on cells including target secondary cells. Thus, during the handover process, the target secondary cells may be configured for the UE as fast as possible, influence of the data transmission rate on the UE during the handover process may be reduced, and user experiences may be improved.

Embodiment 4

Embodiment 4 of this disclosure provides a cell configuration method, applicable to a network device side, particularly applicable to a network device side taken as a source side of handover, i.e. a first network device side. This method corresponds to the cell configuration method applicable to a user equipment side in Embodiment 1, and reference may be made to what is contained in Embodiment 1 for identical contents.

Figure 7:
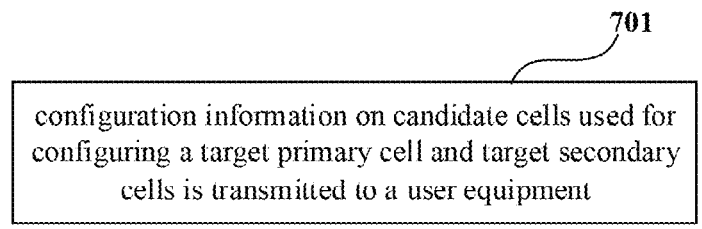
FIG. 7 is a schematic diagram of the cell configuration method of Embodiment 4 of this disclosure.

FIG. 7 is a schematic diagram of the cell configuration method of Embodiment 4 of this disclosure. As shown in FIG. 7, the method includes:

Step 701: configuration information on candidate cells used for configuring a target primary cell and target secondary cells is transmitted to a user equipment.

For example, the user equipment may transmit quality measurement results of cells having best quality in frequencies in a form of an early report to the first network taken as a network device side at a source side. After receiving the early report from the user equipment, the first network device decides whether to perform conditional handover (HO) according to the early report. When the first network device decides to perform conditional handover, it may determine a network device to which cells having best quality belong according to information on the cell (such as ID information), and determine the network device as a network device at a target side of the handover, i.e. a second network device. Thereafter, the first network device transmits an HO request including the cell information list to the second network device, and the second network device generates configuration information on candidate cells used for configuring a target primary cell and target secondary cells according to the received HO request and transmits the information to the first network device.

In this embodiment, a case where the configuration information includes a condition for configuring candidate cell as a target primary cell and/or target secondary cells, i.e. including a handover condition, shall be explained first.

Figure 8:
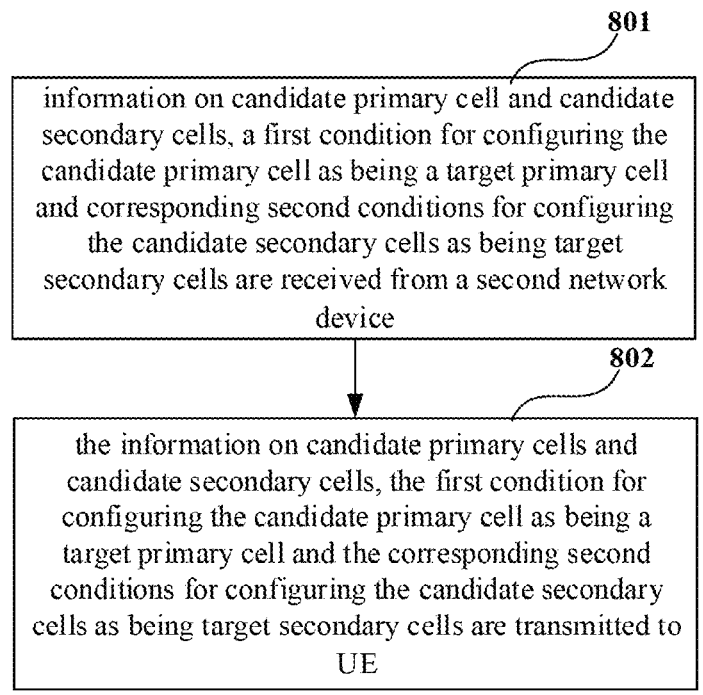
FIG. 8 is another schematic diagram of the cell configuration method of Embodiment 4 of this disclosure.

FIG. 8 is another schematic diagram of the cell configuration method of Embodiment 4 of this disclosure. As shown in FIG. 8, the method includes:

Step 801: information on candidate primary cell and candidate secondary cells, a first condition for configuring the candidate primary cell as being a target primary cell and corresponding second conditions for configuring the candidate secondary cells as being target secondary cells are received from a second network device; and Step 802: the information on candidate primary cells and candidate secondary cells, the first condition for configuring the candidate primary cell as being a target primary cell and the corresponding second conditions for configuring the candidate secondary cells as being target secondary cells are transmitted to UE.

Figure 9:
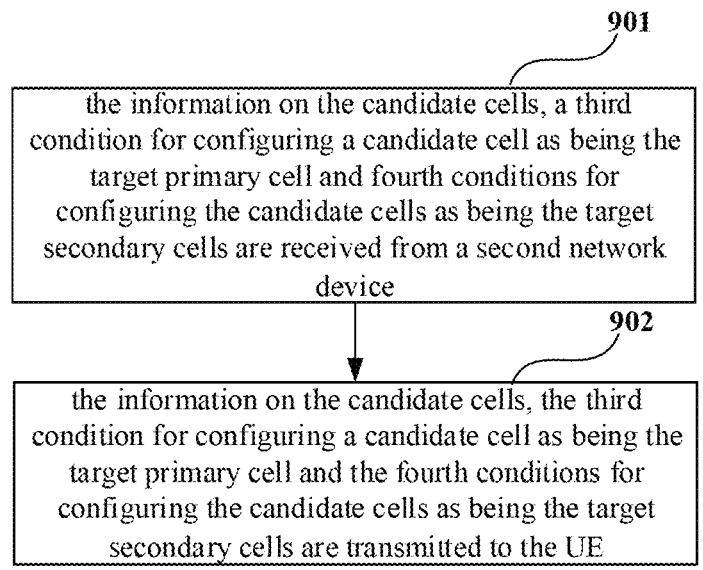
FIG. 9 is a further schematic diagram of the cell configuration method of Embodiment 4 of this disclosure.

FIG. 9 is a further schematic diagram of the cell configuration method of Embodiment 4 of this disclosure. As shown in FIG. 9, the method includes:

Step 901: the information on the candidate cells, a third condition for configuring a candidate cell as being the target primary cell and fourth conditions for configuring the candidate cells as being the target secondary cells are received from a second network device;

Step 902: the information on the candidate cells, the third condition for configuring a candidate cell as being the target primary cell and the fourth conditions for configuring the candidate cells as being the target secondary cells are transmitted to the UE.

In this embodiment, subsequently, a case where the configuration information does not include a condition for configuring candidate cell as a target primary cell and/or target secondary cells, i.e. not including a handover condition, shall be explained.

Figure 10:
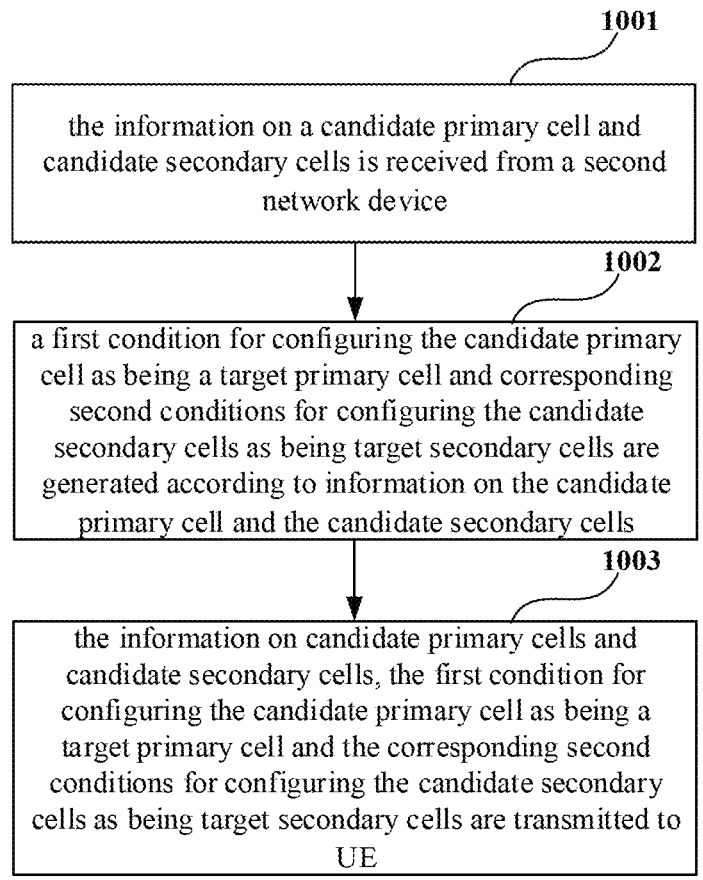
FIG. 10 is a yet another schematic diagram of the cell configuration method of Embodiment 4 of this disclosure.

FIG. 10 is a yet another schematic diagram of the cell configuration method of Embodiment 4 of this disclosure. As shown in FIG. 10, the method includes:

Step 1001: the information on a candidate primary cell and candidate secondary cells is received from a second network device;

Step 1002: a first condition for configuring the candidate primary cell as being a target primary cell and corresponding second conditions for configuring the candidate secondary cells as being target secondary cells are generated according to information on the candidate primary cell and the candidate secondary cells;

Step 1003: the information on candidate primary cells and candidate secondary cells, the first condition for configuring the candidate primary cell as being a target primary cell and the corresponding second conditions for configuring the candidate secondary cells as being target secondary cells are transmitted to UE.

Figure 11:
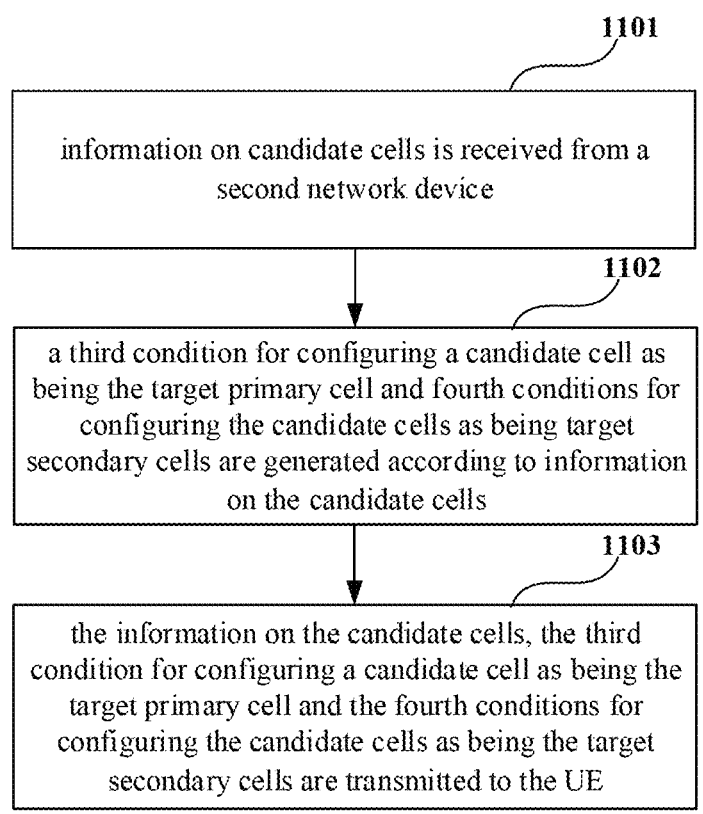
FIG. 11 is still another schematic diagram of the cell configuration method of Embodiment 4 of this disclosure.

FIG. 11 is still another schematic diagram of the cell configuration method of Embodiment 4 of this disclosure. As shown in FIG. 11, the method includes:

Step 1101: information on candidate cells is received from a second network device;

Step 1102: a third condition for configuring a candidate cell as being the target primary cell and fourth conditions for configuring the candidate cells as being target secondary cells are generated according to information on the candidate cells;

Step 1103: the information on the candidate cells, the third condition for configuring a candidate cell as being the target primary cell and the fourth conditions for configuring the candidate cells as being the target secondary cells are transmitted to the UE.

It can be seen from the above embodiment that by transmitting configuration information on candidate cells used for configuring the target primary cell and the target secondary cells, in a case where the UE may have multiple serving cells in conditional handover, configuration may be performed effectively on cells including target secondary cells. Thus, during the handover process, the target secondary cells may be configured for the UE as fast as possible, influence of the data transmission rate on the UE during the handover process may be reduced, and user experiences may be improved.

Embodiment 5

The embodiment of this disclosure provides a cell configuration method, applicable to a user equipment side and a network device side. This method corresponds to the cell configuration methods in embodiments 1, 3 and 4, and reference may be made to embodiments 1, 3 and 4 for particular implementation of this method, with identical contents being not going to be described herein any further.

Figure 12:
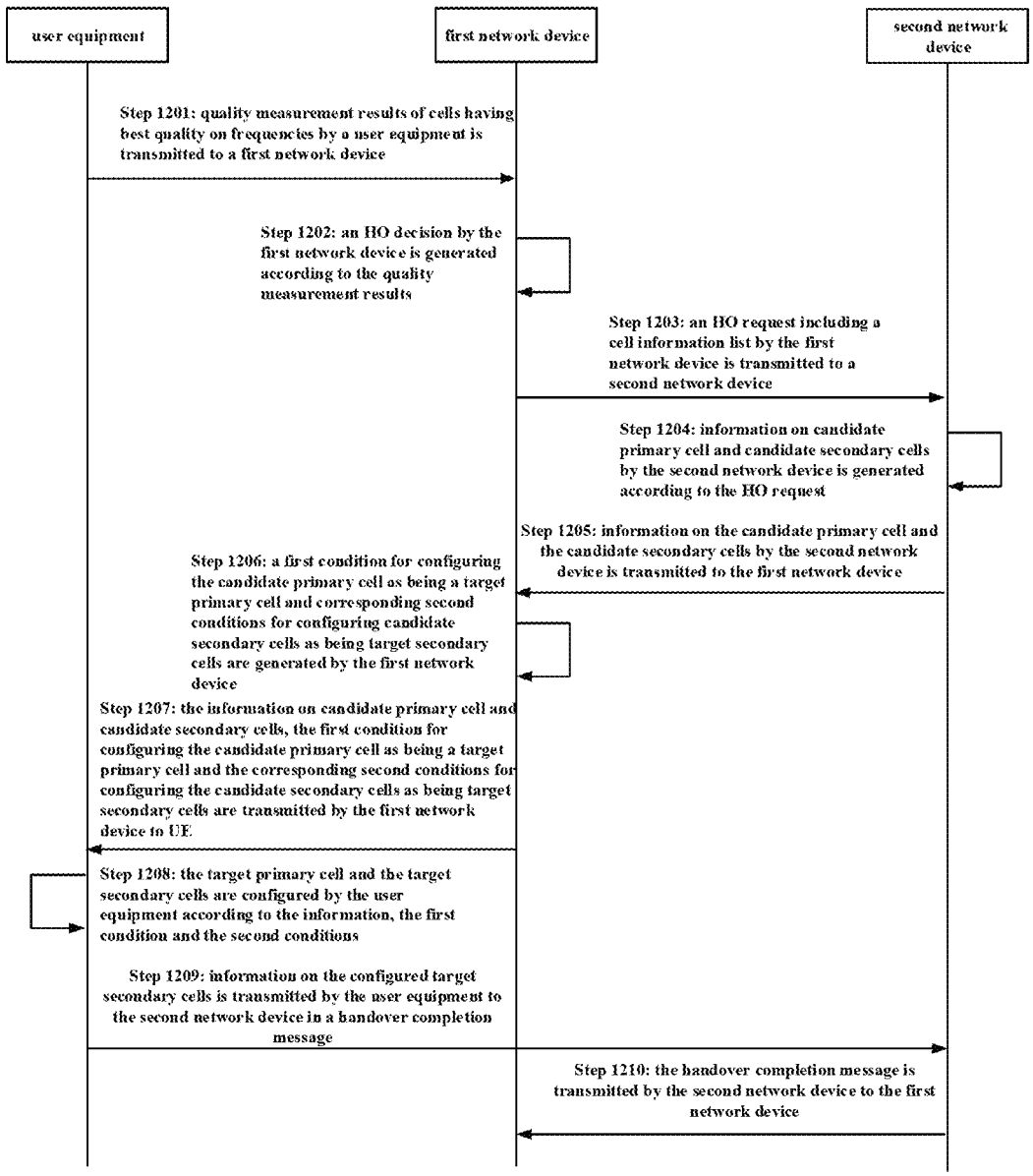
FIG. 12 is a schematic diagram of the cell configuration method of Embodiment 5 of this disclosure.

FIG. 12 is a schematic diagram of the cell configuration method of Embodiment 5 of this disclosure. As shown in FIG. 12, the method includes:

Step 1201: quality measurement results of cells having best quality on frequencies by a user equipment is transmitted to a first network device;

Step 1202: an HO decision by the first network device is generated according to the quality measurement results;

Step 1203: an HO request including a cell information list by the first network device is transmitted to a second network device;

Step 1204: information on candidate primary cell and candidate secondary cells by the second network device is generated according to the HO request;

Step 1205: information on the candidate primary cell and the candidate secondary cells by the second network device is transmitted to the first network device;

Step 1206: a first condition for configuring the candidate primary cell as being a target primary cell and corresponding second conditions for configuring candidate secondary cells as being target secondary cells are generated by the first network device;

Step 1207: the information on candidate primary cell and candidate secondary cells, the first condition for configuring the candidate primary cell as being a target primary cell and the corresponding second conditions for configuring the candidate secondary cells as being target secondary cells are transmitted by the first network device to UE;

Step 1208: the target primary cell and the target secondary cells are configured by the user equipment according to the information, the first condition and the second conditions;

Step 1209: information on the configured target secondary cells is transmitted by the user equipment to the second network device in a handover complete message; and Step 1210: the handover complete message is transmitted by the second network device to the first network device.

Figure 13:
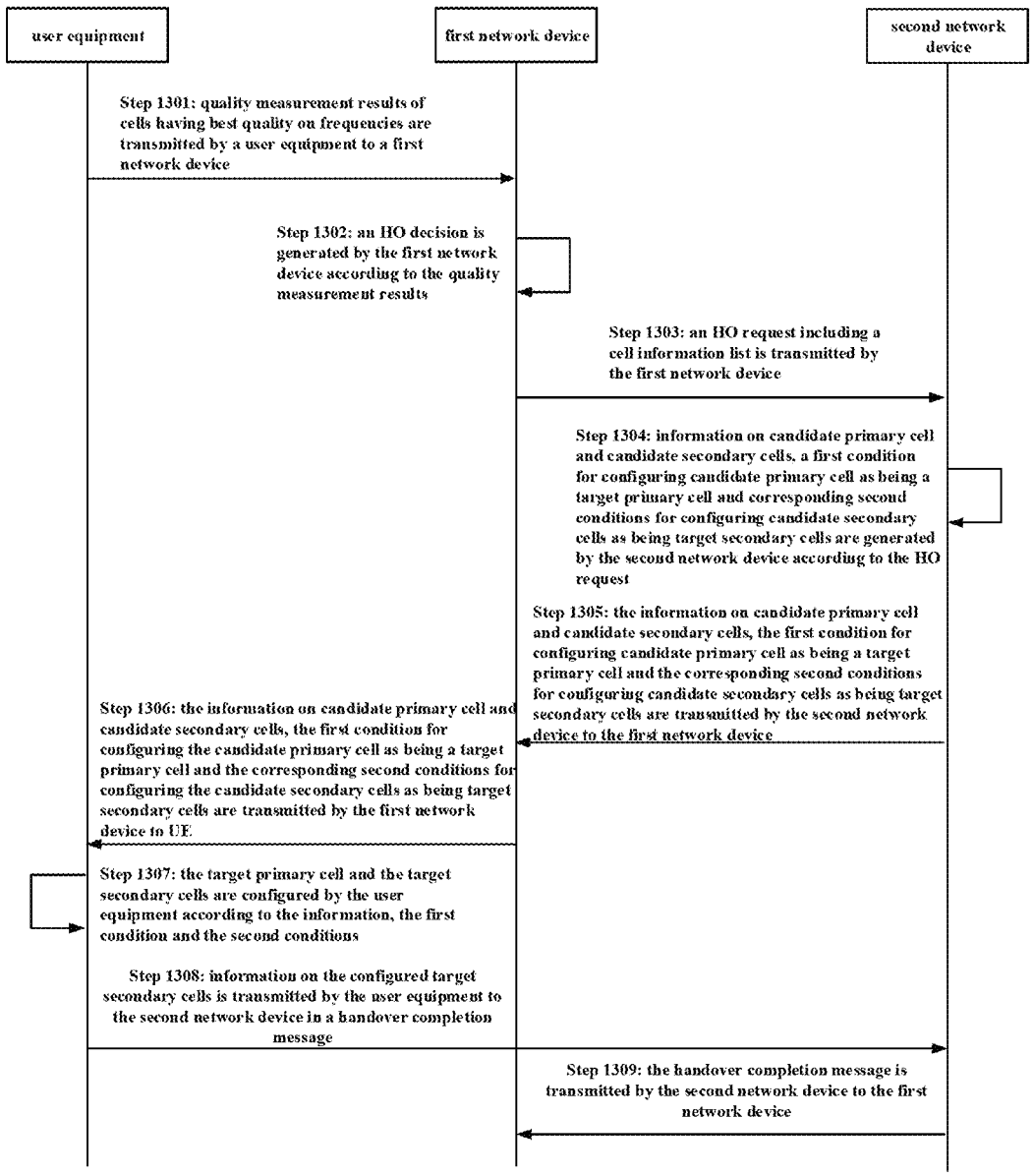
FIG. 13 is another schematic diagram of the cell configuration method of Embodiment 5 of this disclosure.

FIG. 13 is another schematic diagram of the cell configuration method of Embodiment 5 of this disclosure. As shown in FIG. 13, the method includes:

Step 1301: quality measurement results of cells having best quality on frequencies are transmitted by a user equipment to a first network device;

Step 1302: an HO decision is generated by the first network device according to the quality measurement results;

Step 1303: an HO request including a cell information list is transmitted by the first network device;

Step 1304: information on candidate primary cell and candidate secondary cells, a first condition for configuring candidate primary cell as being a target primary cell and corresponding second conditions for configuring candidate secondary cells as being target secondary cells are generated by the second network device according to the HO request;

Step 1305: the information on candidate primary cell and candidate secondary cells, the first condition for configuring candidate primary cell as being a target primary cell and the corresponding second conditions for configuring candidate secondary cells as being target secondary cells are transmitted by the second network device to the first network device;

Step 1306: the information on candidate primary cell and candidate secondary cells, the first condition for configuring the candidate primary cell as being a target primary cell and the corresponding second conditions for configuring the candidate secondary cells as being target secondary cells are transmitted by the first network device to UE;

Step 1307: the target primary cell and the target secondary cells are configured by the user equipment according to the information, the first condition and the second conditions;

Step 1308: information on the configured target secondary cells is transmitted by the user equipment to the second network device in a handover completion message; and Step 1309: the handover complete message is transmitted by the second network device to the first network device.

In this embodiment, reference may be made to the contents contained in embodiments 1, 3 and 4 for particular implementations of the above steps, which shall not be describe herein any further.

It can be seen from the above embodiment that by receiving configuration information on candidate cells from the network device at the source side, when a candidate cell satisfies a condition for performing conditional handover, a target primary cell and target secondary cells are configured according to the configuration information. Hence, in a case where the UE may have multiple serving cells in conditional handover, configuration may be performed effectively on cells including target secondary cells. Thus, during the handover process, the target secondary cells may be configured for the UE as fast as possible, influence of the data transmission rate on the UE during the handover process may be reduced, and user experiences may be improved.

Embodiment 6

The embodiment of this disclosure provides a cell configuration method, applicable to a user equipment side and a network device side. This method corresponds to the cell configuration methods in embodiments 1, 3 and 4, and reference may be made to embodiments 1, 3 and 4 for particular implementation of this method, with identical contents being not going to be described herein any further.

Figure 14:
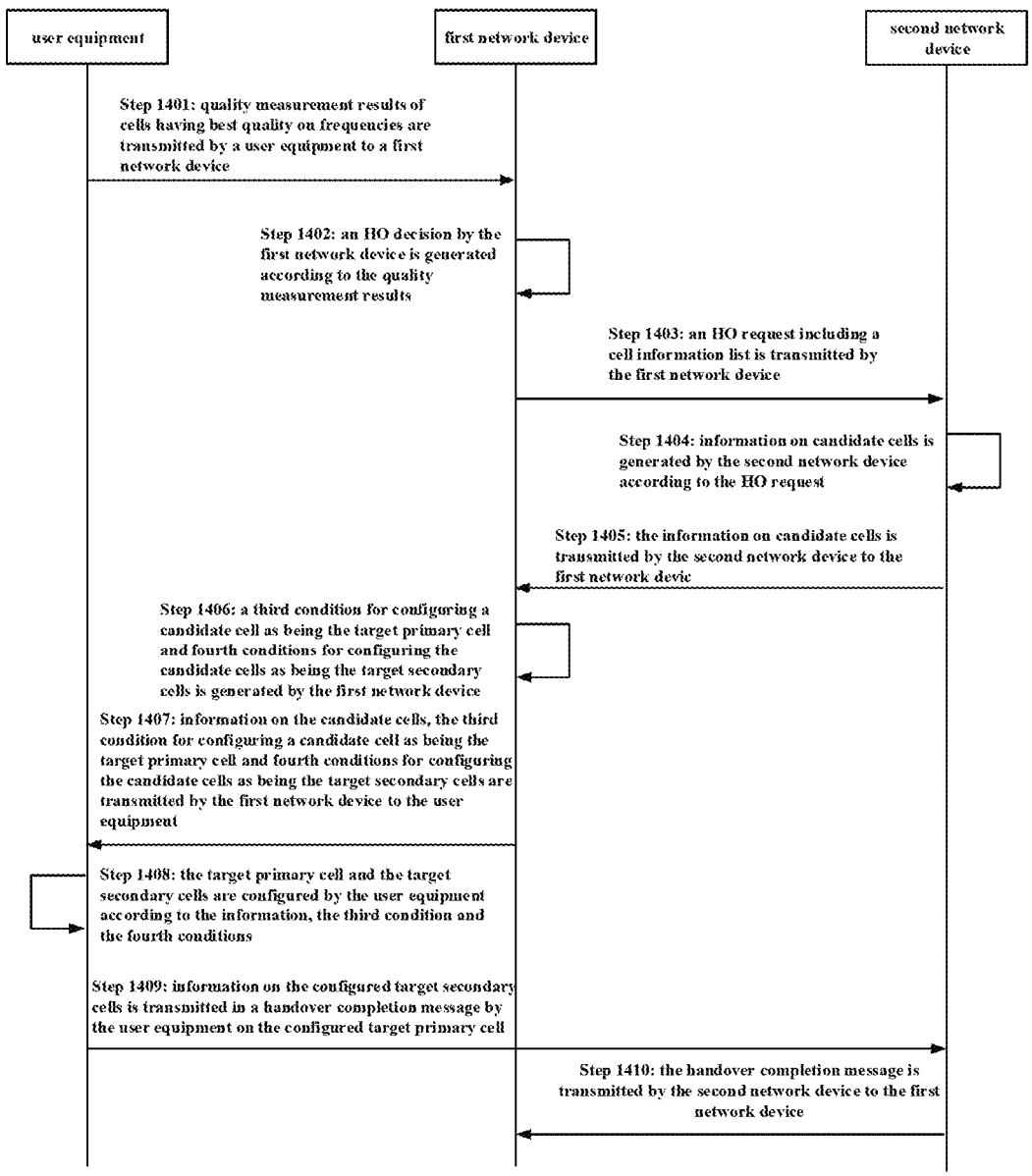
FIG. 14 is a schematic diagram of the cell configuration method of Embodiment 6 of this disclosure.

FIG. 14 is a schematic diagram of the cell configuration method of Embodiment 6 of this disclosure. As shown in FIG. 14, the method includes:

Step 1401: quality measurement results of cells having best quality on frequencies are transmitted by a user equipment to a first network device;

Step 1402: an HO decision by the first network device is generated according to the quality measurement results;

Step 1403: an HO request including a cell information list is transmitted by the first network device;

Step 1404: information on candidate cells is generated by the second network device according to the HO request;

Step 1405: the information on candidate cells is transmitted by the second network device to the first network device;

Step 1406: a third condition for configuring a candidate cell as being the target primary cell and fourth conditions for configuring the candidate cells as being the target secondary cells is generated by the first network device;

Step 1407: information on the candidate cells, the third condition for configuring a candidate cell as being the target primary cell and fourth conditions for configuring the candidate cells as being the target secondary cells are transmitted by the first network device to the user equipment;

Step 1408: the target primary cell and the target secondary cells are configured by the user equipment according to the information, the third condition and the fourth conditions;

Step 1409: information on the configured target secondary cells is transmitted in a handover complete message by the user equipment on the configured target primary cell; and Step 1410: the handover complete message is transmitted by the second network device to the first network device.

Figure 15:
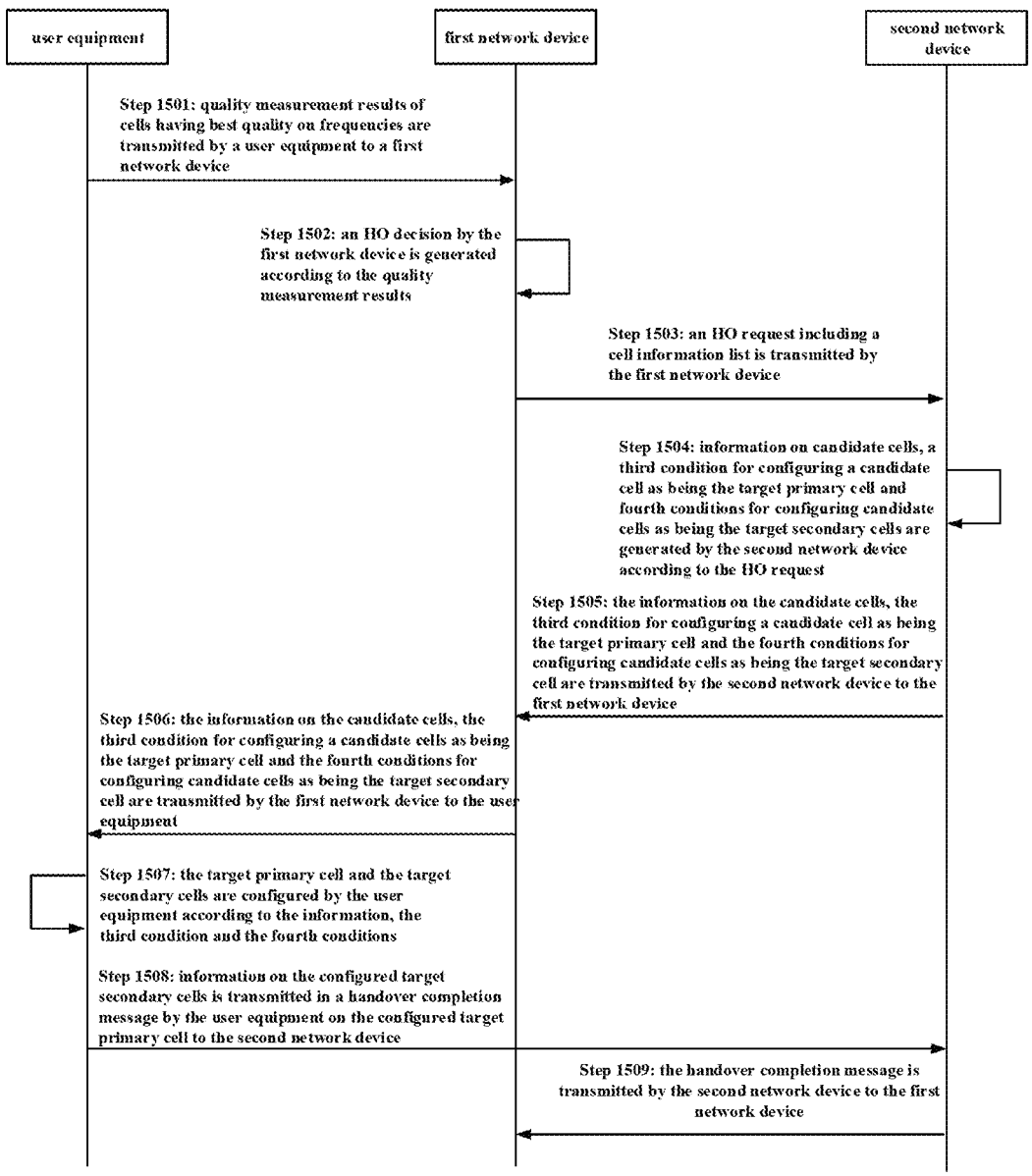
FIG. 15 is another schematic diagram of the cell configuration method of Embodiment 6 of this disclosure.

FIG. 15 is another schematic diagram of the cell configuration method of Embodiment 6 of this disclosure. As shown in FIG. 15, the method includes:

Step 1501: quality measurement results of cells having best quality on frequencies are transmitted by a user equipment to a first network device;

Step 1502: an HO decision by the first network device is generated according to the quality measurement results;

Step 1503: an HO request including a cell information list is transmitted by the first network device;

Step 1504: information on candidate cells, a third condition for configuring a candidate cell as being the target primary cell and fourth conditions for configuring candidate cells as being the target secondary cells are generated by the second network device according to the HO request;

Step 1505: the information on the candidate cells, the third condition for configuring a candidate cell as being the target primary cell and the fourth conditions for configuring candidate cells as being the target secondary cell are transmitted by the second network device to the first network device;

Step 1506: the information on the candidate cells, the third condition for configuring a candidate cells as being the target primary cell and the fourth conditions for configuring candidate cells as being the target secondary cell are transmitted by the first network device to the user equipment;

Step 1507: the target primary cell and the target secondary cells are configured by the user equipment according to the information, the third condition and the fourth conditions;

Step 1508: information on the configured target secondary cells is transmitted in a handover complete message by the user equipment on the configured target primary cell to the second network device; and Step 1509: the handover complete message is transmitted by the second network device to the first network device.

In this embodiment, reference may be made to the contents contained in embodiments 1, 3 and 4 for particular implementations of the above steps, which shall not be describe herein any further.

It can be seen from the above embodiment that by receiving configuration information on candidate cells from the network device at the source side, when a candidate cell satisfies a condition for performing conditional handover, a target primary cell and target secondary cells are configured according to the configuration information. Hence, in a case where the UE may have multiple serving cells in conditional handover, configuration may be performed effectively on cells including target secondary cells. Thus, during the handover process, the target secondary cells may be configured for the UE as fast as possible, influence of the data transmission rate on the UE during the handover process may be reduced, and user experiences may be improved.

Embodiment 7

The embodiment of this disclosure provides a cell configuration method, applicable to a user equipment side and a network side. This method corresponds to the cell configuration method of Embodiment 2, and reference may be made to Embodiment 2 for particular implementation of this method, with repeated parts being not going to be described herein any further.

Figure 16:
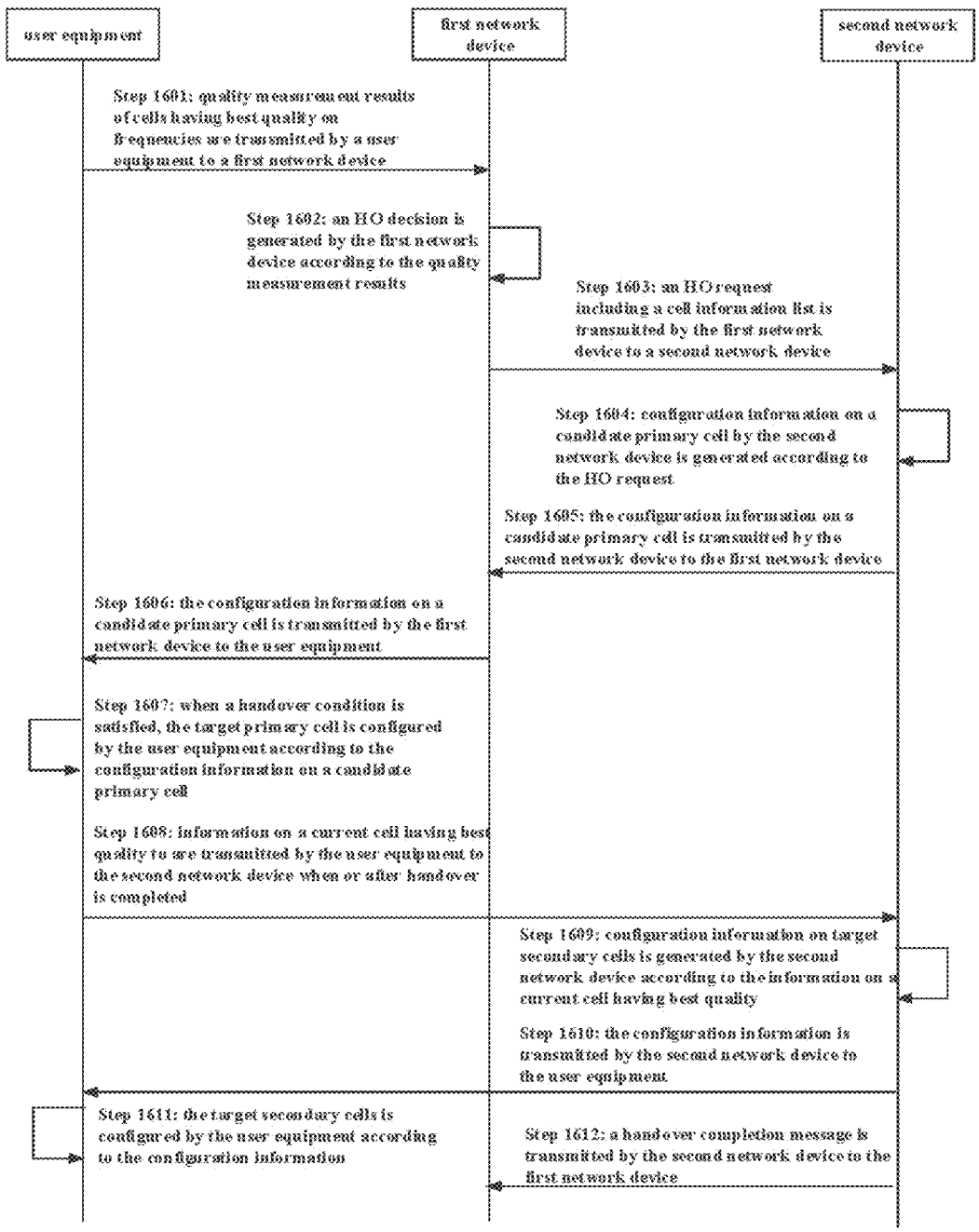
FIG. 16 is a schematic diagram of the cell configuration method of Embodiment 7 of this disclosure.

FIG. 16 is a schematic diagram of the cell configuration method of Embodiment 7 of this disclosure. As shown in FIG. 16, the method includes:

Step 1601: quality measurement results of cells having best quality on frequencies are transmitted by a user equipment to a first network device; or Step 1602: an HO decision is generated by the first network device according to the quality measurement results;

Step 1603: an HO request including a cell information list is transmitted by the first network device to a second network device;

Step 1604: configuration information on a candidate primary cell by the second network device is generated according to the HO request;

Step 1605: the configuration information on a candidate primary cell is transmitted by the second network device to the first network device;

Step 1606: the configuration information on a candidate primary cell is transmitted by the first network device to the user equipment;

Step 1607: when a handover condition is satisfied, the target primary cell is configured by the user equipment according to the configuration information on a candidate primary cell;

Step 1608: information on a current cell having best quality to are transmitted by the user equipment to the second network device when or after handover is completed;

Step 1609: configuration information on target secondary cells is generated by the second network device according to the information on a current cell having best quality;

Step 1610: the configuration information is transmitted by the second network device to the user equipment;

Step 1611: the target secondary cells is configured by the user equipment according to the configuration information;

Step 1612: a handover complete message is transmitted by the second network device to the first network device.

Figure 17:
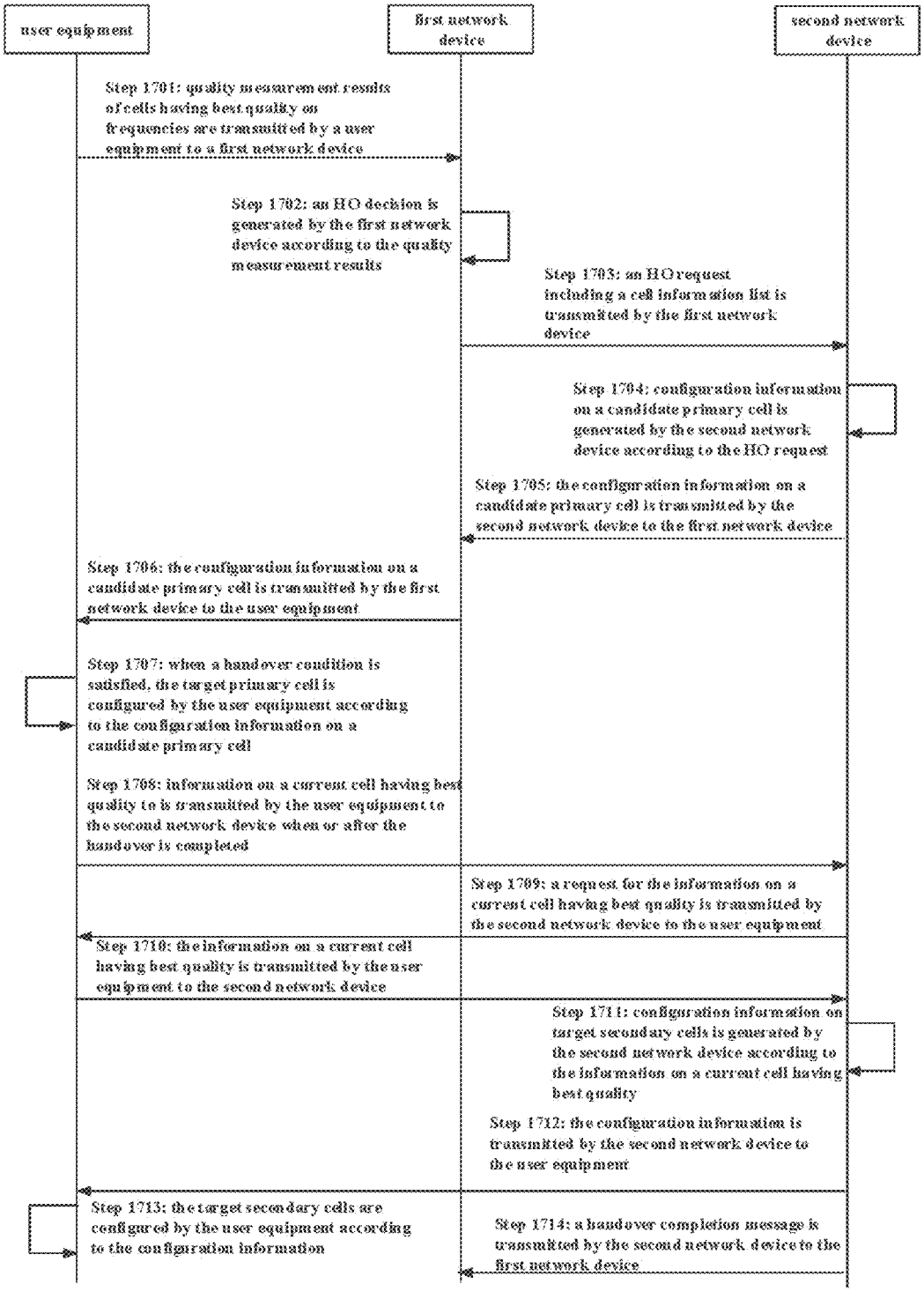
FIG. 17 is another schematic diagram of the cell configuration method of Embodiment 7 of this disclosure.

FIG. 17 is another schematic diagram of the cell configuration method of Embodiment 7 of this disclosure. As shown in FIG. 17, the method includes:

Step 1701: quality measurement results of cells having best quality on frequencies are transmitted by a user equipment to a first network device;

Step 1702: an HO decision is generated by the first network device according to the quality measurement results;

Step 1703: an HO request including a cell information list is transmitted by the first network device;

Step 1704: configuration information on a candidate primary cell is generated by the second network device according to the HO request;

Step 1705: the configuration information on a candidate primary cell is transmitted by the second network device to the first network device;

Step 1706: the configuration information on a candidate primary cell is transmitted by the first network device to the user equipment;

Step 1707: when a handover condition is satisfied, the target primary cell is configured by the user equipment according to the configuration information on a candidate primary cell;

Step 1708: information on a current cell having best quality to is transmitted by the user equipment to the second network device when or after the handover is completed;

Step 1709: a request for the information on a current cell having best quality is transmitted by the second network device to the user equipment;

Step 1710: the information on a current cell having best quality is transmitted by the user equipment to the second network device;

Step 1711: configuration information on target secondary cells is generated by the second network device according to the information on a current cell having best quality;

Step 1712: the configuration information is transmitted by the second network device to the user equipment;

Step 1713: the target secondary cells are configured by the user equipment according to the configuration information; and Step 1714: a handover complete message is transmitted by the second network device to the first network device.

In this embodiment, reference may be made to the contents contained in Embodiment 2 for particular implementations of the above steps, which shall not be described herein any further.

It can be seen from the above embodiment that by transmitting the information on cells having best quality or indication of the information on cells having best quality to a network device at the target side when or after handover is completed, receiving the configuration information on target secondary cells from the second network device and configuring the target secondary cells according to the configuration information, in a case where the UE may have multiple serving cells in conditional handover, configuration may be performed effectively on cells including target secondary cells. Thus, during the handover process, the target secondary cells may be configured for the UE as fast as possible, influence of the data transmission rate on the UE during the handover process may be reduced, and user experiences may be improved.

Embodiment 8

Embodiment 8 of this disclosure provides a cell configuration apparatus, applicable to a user equipment side. This apparatus corresponds to the cell configuration method of Embodiment 1, and reference may be made to Embodiment 1 for implementation of this apparatus, with repeated parts being not going to be described herein any further.

Figure 18:
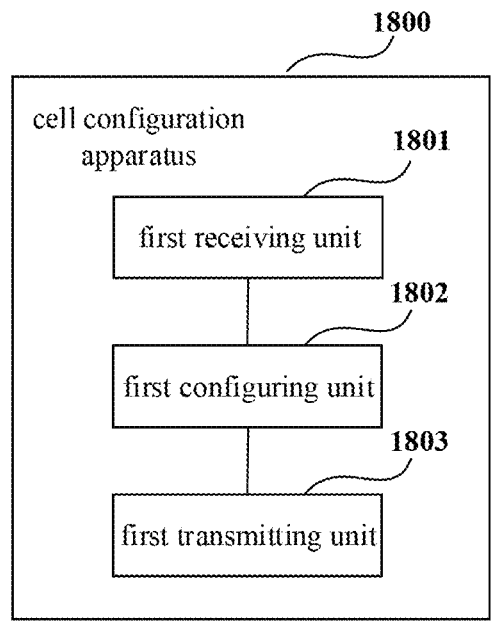
FIG. 18 is a schematic diagram of the cell configuration apparatus of Embodiment 8 of this disclosure.

FIG. 18 is a schematic diagram of the cell configuration apparatus of Embodiment 8 of this disclosure. As shown in FIG. 18, a cell configuration apparatus 1800 includes:
- a first receiving unit 1801 configured to receive configuration information on candidate cells from a first network device; and
- a first configuring unit 1802 configured to, when a candidate cell satisfies a condition for performing conditional handover (HO), configure a target primary cell (PCell) and target secondary cells (SCells) according to the configuration information; and
- a first transmitting unit 1803 configured to transmit information on the configured target secondary cells to a second network device.

In this embodiment, the first receiving unit 1801 is configured to receive information on the candidate cells and the condition for performing conditional handover from the first network device.

Figure 19:
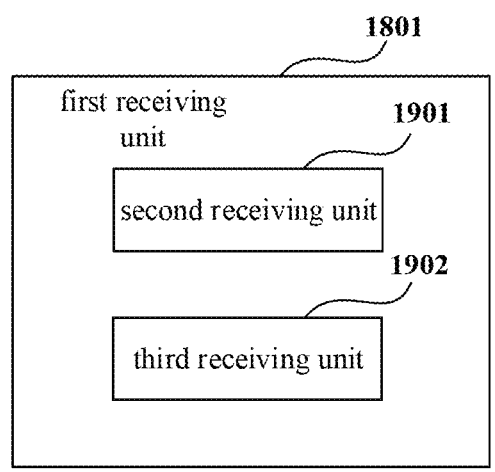
FIG. 19 is a schematic diagram of the first receiving unit 1801 of Embodiment 8 of this disclosure.

FIG. 19 is a schematic diagram of the first receiving unit 1801 of Embodiment 8 of this disclosure. As shown in FIG. 19, the first receiving unit 1801 includes:
- a second receiving unit 1901 configured to receive, from the first network device, information on candidate primary cells and candidate secondary cells, a first condition for configuring a candidate primary cell as being the target primary cell and corresponding second conditions for configuring the candidate secondary cells as being the target secondary cells; or
- a third receiving unit 1902 configured to receive, from the first network device, the information on the candidate cells and a third condition for configuring a candidate cell as being the target primary cell.

Figure 20:
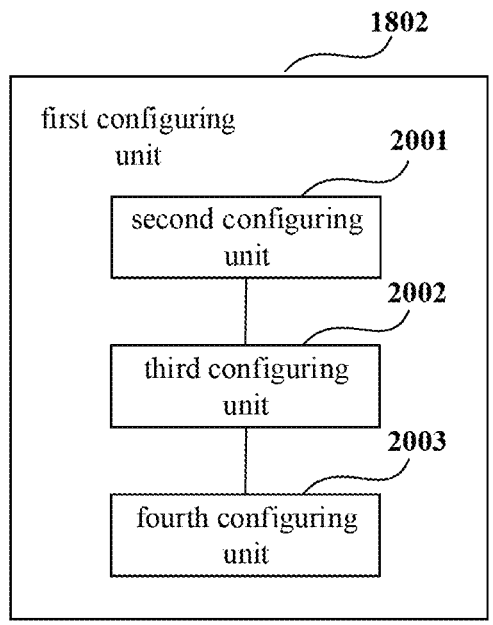
FIG. 20 is a schematic diagram of the first configuring unit 1802 of Embodiment 8 of this disclosure.

FIG. 20 is a schematic diagram of the first configuring unit 1802 of Embodiment 8 of this disclosure. As shown in FIG. 20, the first configuring unit 1802 includes at least one of the following:
- a second configuring unit 2001 configured to configure candidate secondary cells currently satisfying corresponding second conditions as being the target secondary cells, or configure candidate secondary cells currently satisfying corresponding second conditions of a predefined or preconfigured number as being the target secondary cells, when the candidate primary cell satisfies the first condition;
- a third configuring unit 2002 configured to configure candidate secondary cells satisfying corresponding second conditions of a predefined or preconfigured number as being the target secondary cells, when the candidate primary cell satisfies the first condition and the second conditions of a predefined or preconfigured number satisfy the second conditions; and
- a fourth configuring unit 2003 configured to, when the candidate primary cell satisfies the first condition and a predefined or preconfigured time is passed, configure candidate secondary cells satisfying corresponding second conditions after passing the predefined or preconfigured time.

Figure 21:
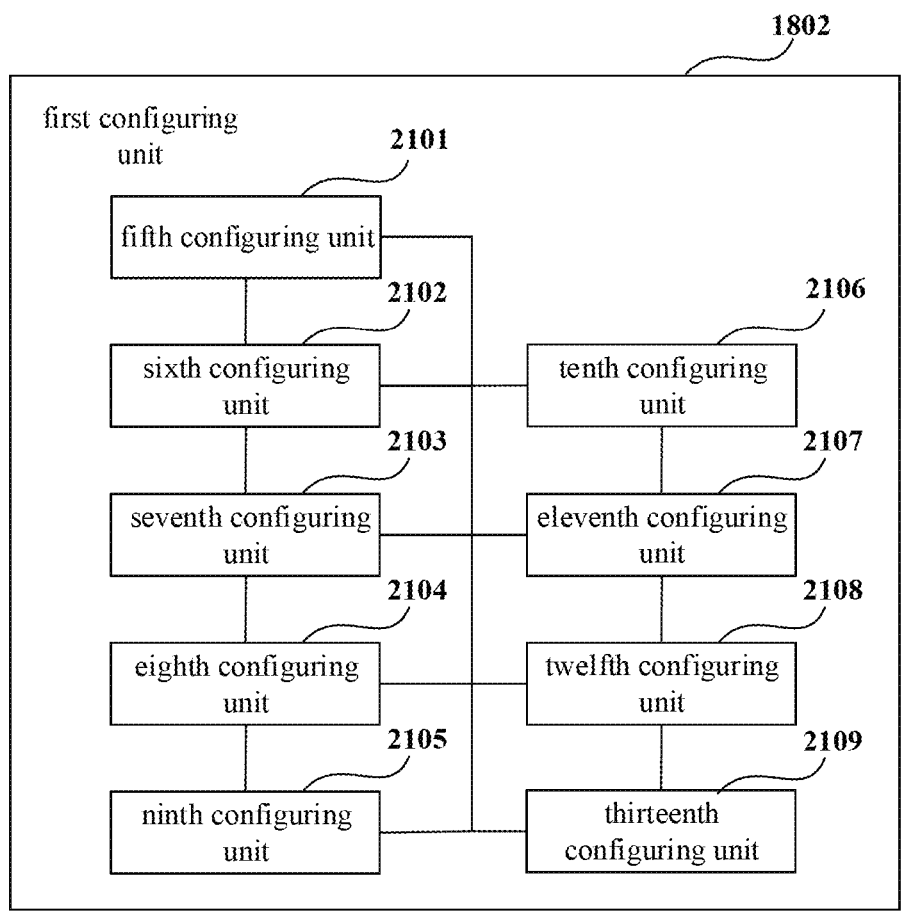
FIG. 21 is another schematic diagram of the first configuring unit 1802 of Embodiment 8 of this disclosure.

FIG. 21 is another schematic diagram of the first configuring unit 1802 of Embodiment 8 of this disclosure. As shown in FIG. 21, the first configuring unit 1802 includes at least one of the following:
- a fifth configuring unit 2101 configured to, when one of the candidate cells satisfies the third condition, configure the candidate cell satisfying the third condition as being the target primary cell;
- a sixth configuring unit 2102 configured to, when at least two of the candidate cells satisfy the third condition, configure either one of the at least two candidate cells as being the target primary cell;
- a seventh configuring unit 2103 configured to, when at least two of the candidate cells satisfy the third condition, configure one of the at least two candidate cells having a best quality measurement result as being the target primary cell;
- an eighth configuring unit 2104 configured to, when at least two of the candidate cells satisfy the third condition, configure one of the at least two candidate cells having a highest priority as being the target primary cell, the priority being predefined or preconfigured;
- a ninth configuring unit 2105 configured to, when at least two of the candidate cells satisfy the third condition, configure one of the at least two candidate cells having a lowest load as being the target primary cell;

and at least one of the following:
- a tenth configuring unit 2106 configured to configure other candidate cells satisfying the fourth conditions in the candidate cells than a candidate cell configured as being the target primary cell as being the target secondary cells;
- an eleventh configuring unit 2107 configured to configure candidate cells in the other candidate cells having loads lower than a predefined or preconfigured fourth threshold as being the target secondary cells;
- a twelfth configuring unit 2108 configured to configure candidate cells in the other candidate cells having quality measurement results higher than or equal to a fifth predefined or preconfigured threshold as being the target secondary cells; and
- a thirteenth configuring unit 2109 configured to configure candidate cells of a predefined or preconfigured number in the other candidate cells having best quality measurement results as being the target secondary cells.

In this embodiment, the first transmitting unit 1803 is configured to, on the configured target primary cell, transmit the information on the configured target secondary cells to the second network device.

It can be seen from the above embodiment that by receiving configuration information on candidate cells from the network device at the source side, when a candidate cell satisfies a condition for performing conditional handover, a target primary cell and target secondary cells are configured according to the configuration information. Hence, in a case where the UE may have multiple serving cells in conditional handover, configuration may be performed effectively on cells including target secondary cells. Thus, during the handover process, the target secondary cells may be configured for the UE as fast as possible, influence of the data transmission rate on the UE during the handover process may be reduced, and user experiences may be improved.

Embodiment 9

The embodiment of this disclosure provides a cell configuration apparatus, applicable to a user equipment side. This apparatus corresponds to the cell configuration method of Embodiment 2, and reference may be made to Embodiment 2 for implementation of this apparatus, with repeated parts being not going to be described herein any further.

Figure 22:
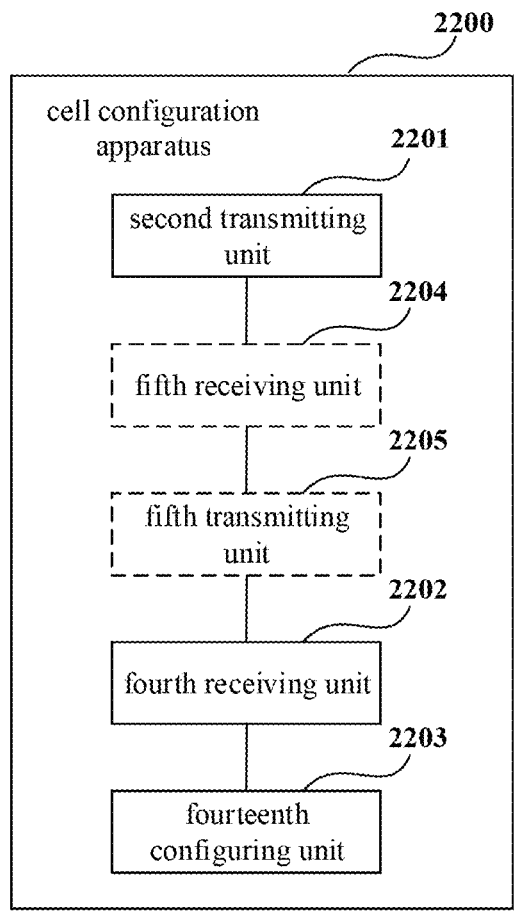
FIG. 22 is a schematic diagram of the cell configuration apparatus of Embodiment 9 of this disclosure.

FIG. 22 is a schematic diagram of the cell configuration apparatus of Embodiment 9 of this disclosure. As shown in FIG. 22, a cell configuration apparatus 2200 includes:

a second transmitting unit 2201 configured to transmit information on cells having best quality or indication of the information on cells having best quality to a second network device when or after handover is completed;

a fourth receiving unit 2202 configured to receive configuration information on target secondary cells from the second network device; and a fourteenth configuring unit 2203 configured to configure the target secondary cells according to the configuration information.

In this embodiment, when the second transmitting unit 2201 transmits the indication of the information on cells having best quality, the cell configuration apparatus 2200 may further include:

a fifth receiving unit 2204 configured to receive a request for transmitting the information on cells having best quality from the second network device; and a fifth transmitting unit 2205 configured to transmit the information on cells having best quality to the second network device.

Figure 23:
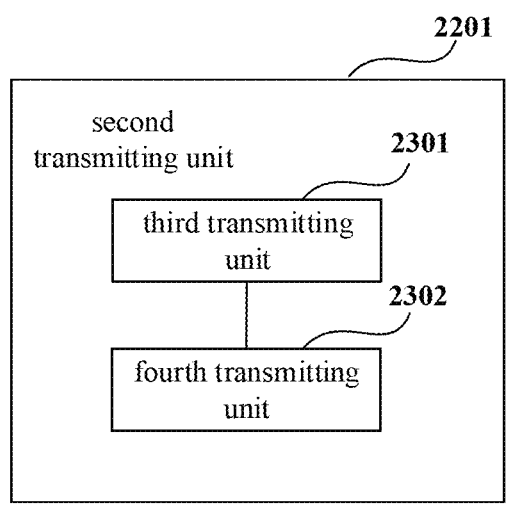
FIG. 23 is a schematic diagram of the second transmitting unit 2201 of Embodiment 9 of this disclosure.

FIG. 23 is a schematic diagram of the second transmitting unit 2201 of Embodiment 9 of this disclosure. As shown in FIG. 23, the second transmitting unit 2201 includes:

a third transmitting unit 2301 configured to transmit, in a handover completion message, the information on cells having best quality or the indication of the information on cells having best quality, to the second network device; or a fourth transmitting unit 2302 configured to transmit the information on cells having best quality or the indication of the information on cells having best quality to the second network device after the handover complete message is transmitted to the second network device.

It can be seen from the above embodiment that by transmitting the information on cells having best quality or indication of the information on cells having best quality to a network device at the target side when or after handover is completed, receiving the configuration information on target secondary cells from the second network device and configuring the target secondary cells according to the configuration information, in a case where the UE may have multiple serving cells in conditional handover, configuration may be performed effectively on cells including target secondary cells. Thus, during the handover process, the target secondary cells may be configured for the UE as fast as possible, influence of the data transmission rate on the UE during the handover process may be reduced, and user experiences may be improved.

Embodiment 10

The embodiment of this disclosure provides a cell configuration apparatus, applicable to a network device side. This apparatus corresponds to the cell configuration method of Embodiment 3, and reference may be made to Embodiment 3 for implementation of this apparatus, with repeated parts being not going to be described herein any further.

Figure 24:
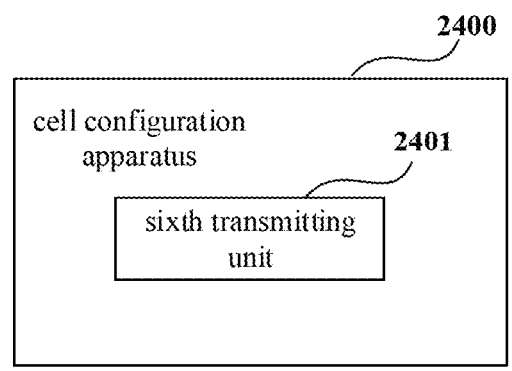
FIG. 24 is a schematic diagram of the cell configuration apparatus of Embodiment 10 of this disclosure.

FIG. 24 is a schematic diagram of the cell configuration apparatus of Embodiment 10 of this disclosure. As shown in FIG. 24, a cell configuration apparatus 2400 includes:

a sixth transmitting unit 2401 configured to transmit configuration information on candidate cells used for configuring a target primary cell and target secondary cells to a first network device.

Figure 25:
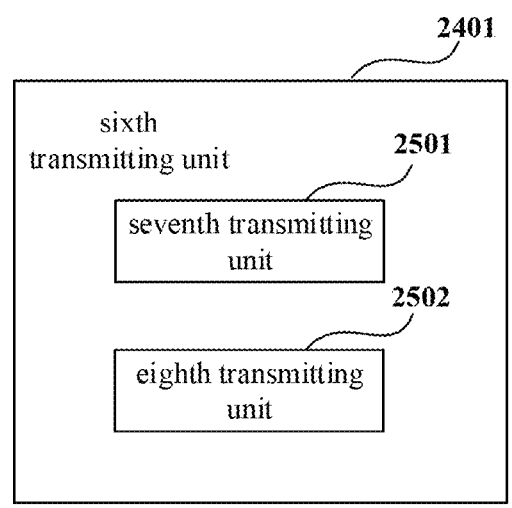
FIG. 25 is a schematic diagram of the sixth transmitting unit 2401 of Embodiment 10 of this disclosure.

FIG. 25 is a schematic diagram of the sixth transmitting unit 2401 of Embodiment 10 of this disclosure. As shown in FIG. 25, the sixth transmitting unit 2401 includes:

a seventh transmitting unit 2501 configured to transmit information on candidate primary cells and candidate secondary cells to the first network device; or an eighth transmitting unit 2502 configured to transmit the information on candidate primary cells and candidate secondary cells, a first condition for configuring the candidate primary cells as being a target primary cell and corresponding second conditions for configuring the candidate secondary cells as being target secondary cells, to the first network device.

Figure 26:
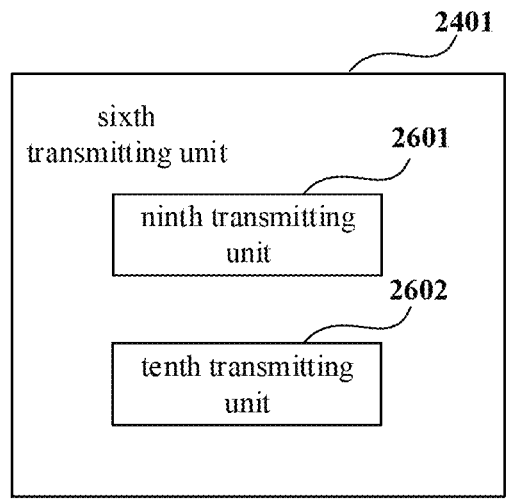
FIG. 26 is another schematic diagram of the sixth transmitting unit 2401 of Embodiment 10 of this disclosure.

FIG. 26 is another schematic diagram of the sixth transmitting unit 2401 of Embodiment 10 of this disclosure. As shown in FIG. 26, the sixth transmitting unit 2401 includes:

a ninth transmitting unit 2601 configured to transmit information on candidate cells to the first network device; or a tenth transmitting unit 2602 configured to transmit the information on candidate cells, a third condition for configuring a candidate cell as being the target primary cell and fourth conditions for configuring the candidate cells as being the target secondary cells, to the first network device.

It can be seen from the above embodiment that by transmitting configuration information on candidate cells used for configuring the target primary cell and the target secondary cells, in a case where the UE may have multiple serving cells in conditional handover, configuration may be performed effectively on cells including target secondary cells. Thus, during the handover process, the target secondary cells may be configured for the UE as fast as possible, influence of the data transmission rate on the UE during the handover process may be reduced, and user experiences may be improved.

Embodiment 11

The embodiment of this disclosure provides a cell configuration apparatus, applicable to a network device side. This apparatus corresponds to the cell configuration method of Embodiment 4, and reference may be made to Embodiment 4 for implementation of this apparatus, with repeated parts being not going to be described herein any further.

Figure 27:
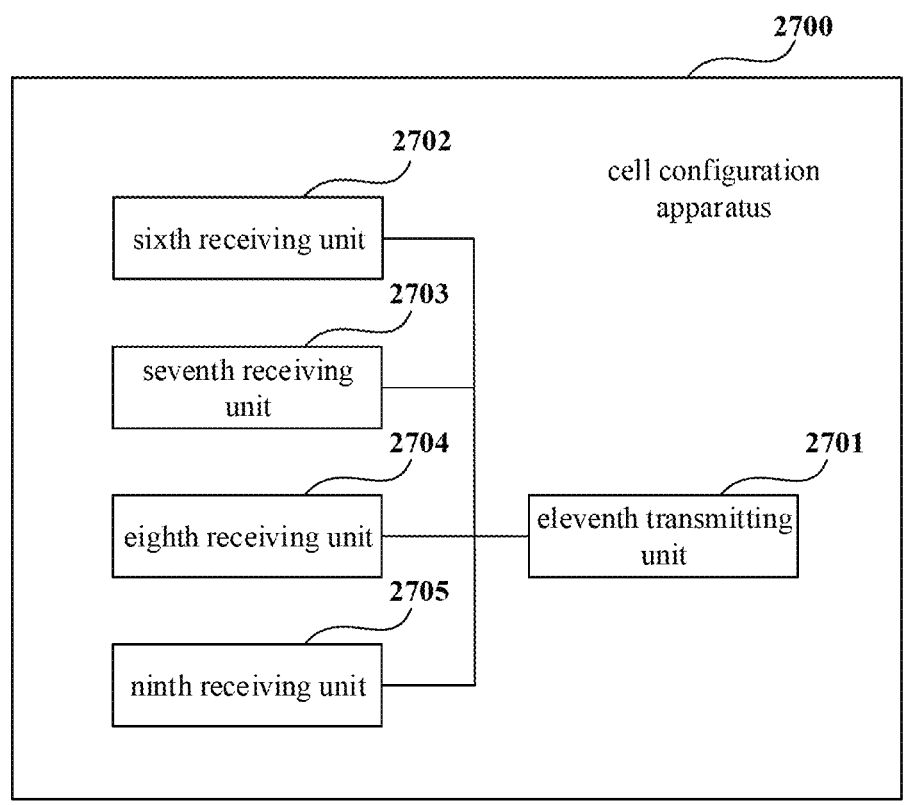
FIG. 27 is a schematic diagram of the cell configuration apparatus of Embodiment 11 of this disclosure.

FIG. 27 is a schematic diagram of the cell configuration apparatus of Embodiment 11 of this disclosure. As shown in FIG. 27, a cell configuration apparatus 2700 includes:

an eleventh transmitting unit 2701 configured to transmit configuration information on candidate cells used for configuring a target primary cell and target secondary cells to a user equipment.

In this embodiment, the cell configuration apparatus 2700 may further include:

a sixth receiving unit 2702 configured to receive information on candidate primary cell and candidate secondary cells, a first condition for configuring the candidate primary cell as being a target primary cell and corresponding second conditions for configuring the candidate secondary cells as being target secondary cells, from a second network device;

and at this moment, the eleventh transmitting unit 2701 is configured to transmit the information on candidate primary cells and candidate secondary cells, the first condition for configuring the candidate primary cell as being a target primary cell and the corresponding second conditions for configuring the candidate secondary cells as being target secondary cells, to UE.

In this embodiment, the cell configuration apparatus 2700 may further include:

a seventh receiving unit 2703 configured to receive the information on candidate primary cells and candidate secondary cells from a second network device;

and at this moment, the eleventh transmitting unit 2701 is configured to transmit the information on candidate primary cells and candidate secondary cells, the first condition for configuring the candidate primary cell as being a target primary cell and the corresponding second conditions for configuring the candidate secondary cells as being target secondary cells, to the UE.

In this embodiment, the cell configuration apparatus 2700 may further include:

an eighth receiving unit 2704 configured to receive information on candidate cells, a third condition for configuring a candidate cell as being the target primary cell and fourth conditions for configuring the candidate cells as being the target secondary cells from the second network device;

and at this moment, the eleventh transmitting unit 2701 is configured to transmit the information on candidate cells, the third condition for configuring a candidate cell as being the target primary cell and the fourth conditions for configuring the candidate cells as being the target secondary cells, to the UE.

In this embodiment, the cell configuration apparatus 2700 may further include:

a ninth receiving unit 2705 configured to receive the information on candidate cells from the second network device;

and at this moment, the eleventh transmitting unit 2701 is configured to transmit the information on candidate cells, the third condition for configuring a candidate cell as being the target primary cell and the fourth conditions for configuring the candidate cells as being the target secondary cells, to the UE.

It can be seen from the above embodiment that by transmitting configuration information on candidate cells used for configuring the target primary cell and the target secondary cells, in a case where the UE may have multiple serving cells in conditional handover, configuration may be performed effectively on cells including target secondary cells. Thus, during the handover process, the target secondary cells may be configured for the UE as fast as possible, influence of the data transmission rate on the UE during the handover process may be reduced, and user experiences may be improved.

Embodiment 12

The embodiment of this disclosure provides a UE, including the cell configuration apparatus as described in Embodiment 8.

Figure 28:
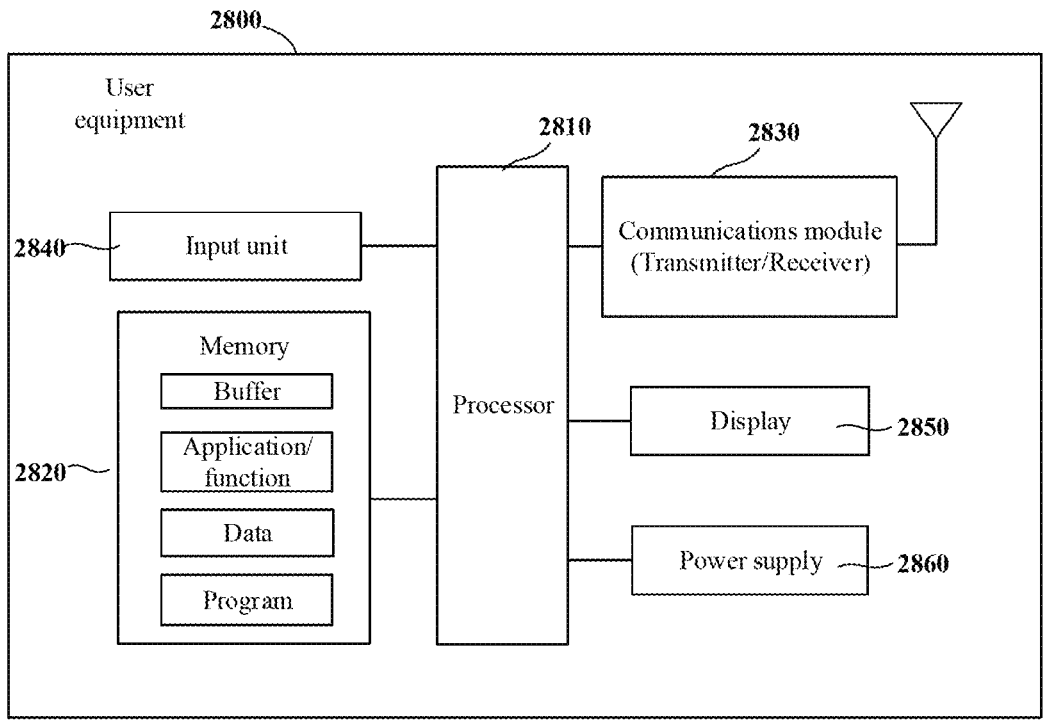
FIG. 28 is a block diagram of a systematic structure of the user equipment of Embodiment 12 of this disclosure.

FIG. 28 is a block diagram of a systematic structure of the user equipment of Embodiment 12 of this disclosure. As show in FIG. 28, a user equipment 2800 may include a processor 2810 and a memory 2820, the memory 2820 being coupled to the processor 2810. It should be noted that his figure is illustrative only, and other types of structures may also be used, so as to supplement or replace this structure and achieve a telecommunications function or other functions.

In one implementation, functions of the cell configuration apparatus may be integrated into the processor 2810. For example, the processor 2810 may be configured to: receive configuration information on candidate cells from a first network device; and when a candidate cell satisfies a condition for performing conditional handover (HO), configure a target primary cell (PCell) and target secondary cells (SCells) according to the configuration information.

In another implementation, the cell configuration apparatus and the processor 2810 may be configured separately; for example, the cell configuration apparatus may be configured as a chip connected to the processor 2810, and the functions of the cell configuration apparatus are executed under control of the processor 2810.

As shown in FIG. 28, the user equipment 2800 may further include a communications module 2830, an input unit 2840, a display 2850, and a power supply 2860. It should be noted that the user equipment 2800 does not necessarily include all the parts shown in FIG. 28, and the above components are not necessary. Furthermore, the user equipment 2800 may include parts not shown in FIG. 28, and the related art may be referred to.

As shown in FIG. 28, the processor 2810 is sometimes referred to as a controller or control, which may include a microprocessor or other processor devices and/or logic devices, and the processor 2810 receives input and controls operations of every component of the user equipment 2800.

The memory 2820 may be, for example, one or more of a buffer memory, a flash memory, a hard drive, a mobile medium, a volatile memory, a nonvolatile memory, or other suitable devices, which may store the information on configuration, etc., and furthermore, store programs executing related information. And the processor 2810 may execute programs stored in the memory 2820, so as to realize information storage or processing, etc. Functions of other parts are similar to those of the related art, which shall not be described herein any further. The parts of the terminal device, or the user equipment 2800 may be realized by specific hardware, firmware, software, or any combination thereof, without departing from the scope of this disclosure.

It can be seen from the above embodiment that by receiving configuration information on candidate cells from the network device at the source side, when a candidate cell satisfies a condition for performing conditional handover, a target primary cell and target secondary cells are configured according to the configuration information. Hence, in a case where the UE may have multiple serving cells in conditional handover, configuration may be performed effectively on cells including target secondary cells. Thus, during the handover process, the target secondary cells may be configured for the UE as fast as possible, influence of the data transmission rate on the UE during the handover process may be reduced, and user experiences may be improved.

Embodiment 13

The embodiment of this disclosure provides a UE, including the cell configuration apparatus as described in Embodiment 9.

Figure 29:
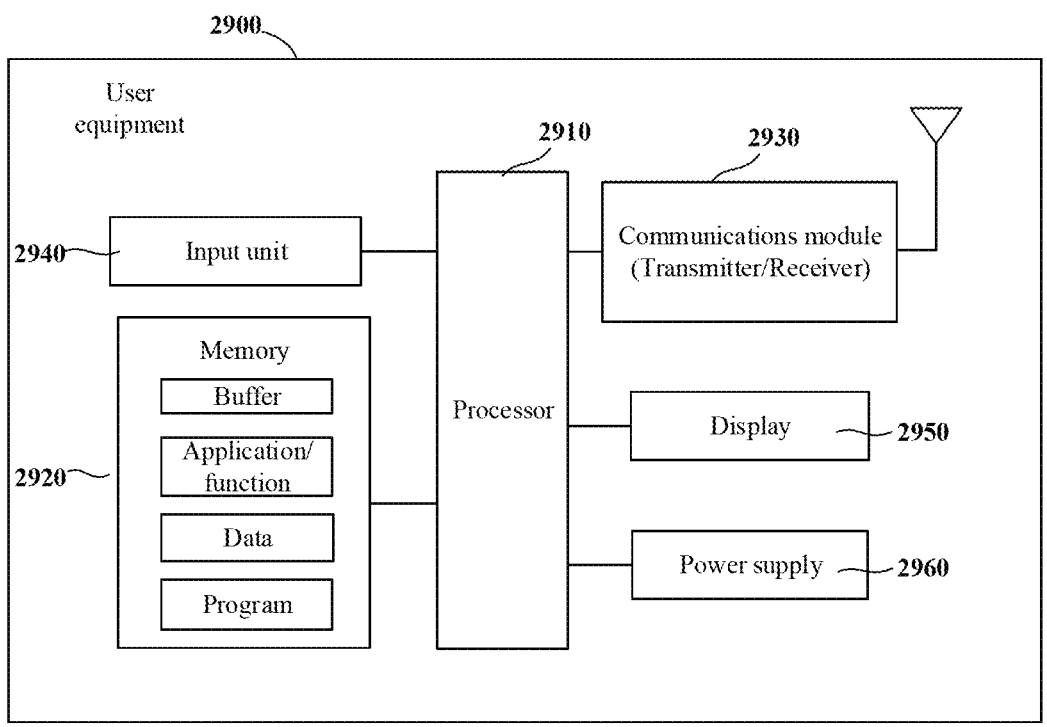
FIG. 29 is a block diagram of a systematic structure of the user equipment of Embodiment 13 of this disclosure.

FIG. 29 is a block diagram of a systematic structure of the user equipment of Embodiment 13 of this disclosure. As show in FIG. 29, a user equipment 2900 may include a processor 2910 and a memory 2920, the memory 2920 being coupled to the processor 2910. It should be noted that his figure is illustrative only, and other types of structures may also be used, so as to supplement or replace this structure and achieve a telecommunications function or other functions.

In one implementation, functions of the cell configuration apparatus may be integrated into the processor 2910. For example, the processor 2910 may be configured to: transmit information on cells having best quality or indication of the information on cells having best quality to a second network device when or after handover is completed; receive configuration information on target secondary cells from the second network device; and configure the target secondary cells according to the configuration information.

In another implementation, the cell configuration apparatus and the processor 2910 may be configured separately; for example, the cell configuration apparatus may be configured as a chip connected to the processor 2910, and the functions of the cell configuration apparatus are executed under control of the processor 2910.

As shown in FIG. 29, the user equipment 2900 may further include a communications module 2930, an input unit 2940, a display 2950, and a power supply 2960. It should be noted that the user equipment 2900 does not necessarily include all the parts shown in FIG. 29, and the above components are not necessary. Furthermore, the user equipment 2900 may include parts not shown in FIG. 29, and the related art may be referred to.

As shown in FIG. 29, the processor 2910 is sometimes referred to as a controller or control, which may include a microprocessor or other processor devices and/or logic devices, and the processor 2910 receives input and controls operations of every component of the user equipment 2900.

The memory 2920 may be, for example, one or more of a buffer memory, a flash memory, a hard drive, a mobile medium, a volatile memory, a nonvolatile memory, or other suitable devices, which may store the information on configuration, etc., and furthermore, store programs executing related information. And the processor 2910 may execute programs stored in the memory 2920, so as to realize information storage or processing, etc. Functions of other parts are similar to those of the related art, which shall not be described herein any further. The parts of the terminal device, or the user equipment 2900 may be realized by specific hardware, firmware, software, or any combination thereof, without departing from the scope of this disclosure.

It can be seen from the above embodiment that by transmitting the information on cells having best quality or indication of the information on cells having best quality to a network device at the target side when or after handover is completed, receiving the configuration information on target secondary cells from the second network device and configuring the target secondary cells according to the configuration information, in a case where the UE may have multiple serving cells in conditional handover, configuration may be performed effectively on cells including target secondary cells. Thus, during the handover process, the target secondary cells may be configured for the UE as fast as possible, influence of the data transmission rate on the UE during the handover process may be reduced, and user experiences may be improved.

Embodiment 14

The embodiment of this disclosure provides a network device, including the cell configuration apparatus as described in Embodiment 10.

Figure 30:
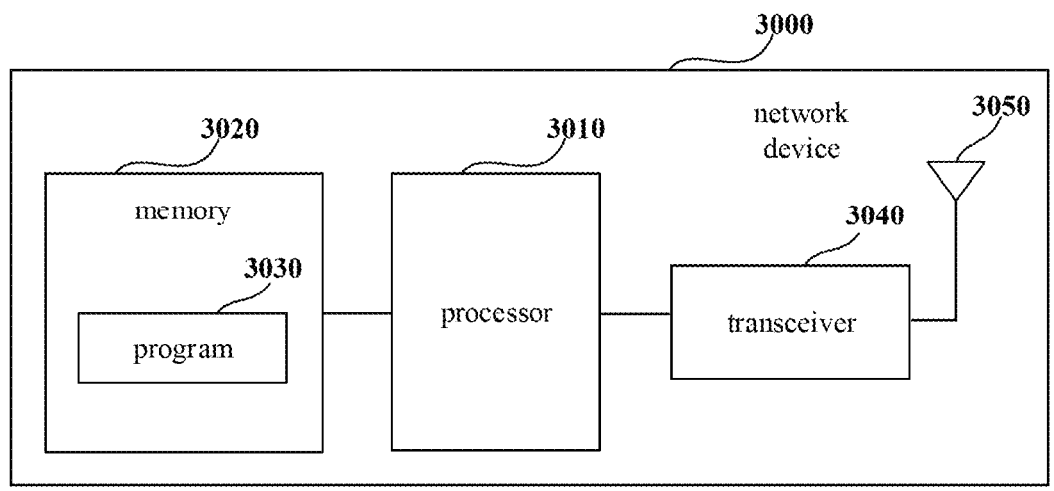
FIG. 30 is a schematic diagram of a structure of the network device of Embodiment 14 of this disclosure.

FIG. 30 is a schematic diagram of a structure of the network device of Embodiment 14 of this disclosure. As show in FIG. 30, a network device 3000 may include a processor 3010 and a memory 3020, the memory 3020 being coupled to the processor 3010. The memory 3020 may store various data, and furthermore, it may store a program 3030 for information processing, and execute the program 3030 under control of the processor 3010, so as to receive various information transmitted by a UE, and transmit various information to the UE.

In one implementation, functions of the cell configuration apparatus may be integrated into the processor 3010. For example, the processor 3010 may be configured to: transmit configuration information on candidate cells used for configuring a target primary cell and target secondary cells to a first network device.

In another implementation, the cell configuration apparatus and the processor 3010 may be configured separately; for example, the cell configuration apparatus may be configured as a chip connected to the processor 3010, and the functions of the cell configuration apparatus are executed under control of the processor 3010.

As shown in FIG. 30, the network device 3000 may further include a transceiver 3040, and an antenna 3050, etc.; wherein functions of the above components are similar to those in the related art, and shall not be described herein any further. It should be noted that the network device 3000 does not necessarily include all the parts shown in FIG. 30, and the above components are not necessary. Furthermore, the network device 3000 may include parts not shown in FIG. 30, and the related art may be referred to.

It can be seen from the above embodiment that by transmitting configuration information on candidate cells used for configuring the target primary cell and the target secondary cells, in a case where the UE may have multiple serving cells in conditional handover, configuration may be performed effectively on cells including target secondary cells. Thus, during the handover process, the target secondary cells may be configured for the UE as fast as possible, influence of the data transmission rate on the UE during the handover process may be reduced, and user experiences may be improved.

Embodiment 15

The embodiment of this disclosure provides a network device, including the cell configuration apparatus as described in Embodiment 11.

Figure 31:
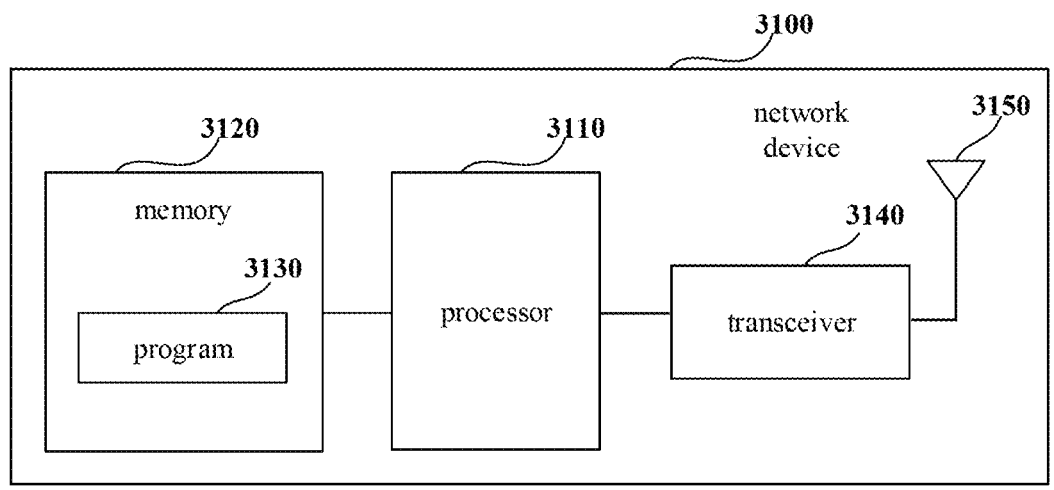
FIG. 31 is a schematic diagram of a structure of the network device of Embodiment 15 of this disclosure.

FIG. 31 is a schematic diagram of a structure of the network device of Embodiment 15 of this disclosure. As show in FIG. 31, a network device 3100 may include a processor 3110 and a memory 3120, the memory 3120 being coupled to the processor 3110. The memory 3120 may store various data, and furthermore, it may store a program 3130 for information processing, and execute the program 3130 under control of the processor 3110, so as to receive various information transmitted by a UE, and transmit various information to the UE.

In one implementation, functions of the cell configuration apparatus may be integrated into the processor 3110. For example, the processor 3110 may be configured to: transmit configuration information on candidate cells used for configuring a target primary cell and target secondary cells to a user equipment.

In another implementation, the cell configuration apparatus and the processor 3110 may be configured separately; for example, the cell configuration apparatus may be configured as a chip connected to the processor 3110, and the functions of the cell configuration apparatus are executed under control of the processor 3110.

As shown in FIG. 31, the network device 3100 may further include a transceiver 3140, and an antenna 3150, etc.; wherein functions of the above components are similar to those in the related art, and shall not be described herein any further. It should be noted that the network device 3100 does not necessarily include all the parts shown in FIG. 31, and the above components are not necessary. Furthermore, the network device 3100 may include parts not shown in FIG. 31, and the related art may be referred to.

It can be seen from the above embodiment that by transmitting configuration information on candidate cells used for configuring the target primary cell and the target secondary cells, in a case where the UE may have multiple serving cells in conditional handover, configuration may be performed effectively on cells including target secondary cells. Thus, during the handover process, the target secondary cells may be configured for the UE as fast as possible, influence of the data transmission rate on the UE during the handover process may be reduced, and user experiences may be improved.

Embodiment 16

The embodiment of this disclosure provides a communications system, including the user equipment described in Embodiment 12, the network device described in Embodiment 14 and the network device described in Embodiment 15. For example, reference may be made to FIG. 1 for a structure of the communications system. As shown in FIG. 1, the communications system 100 includes a first network device 101, a second network device 102 and a user device 103. The first network device 101 is identical to those described in Embodiment 15, the second network device 102 is identical to those described in Embodiment 14, and the user equipment 103 is identical to those described in Embodiment 12, and repeated parts shall not be described herein any further.

It can be seen from the above embodiment that by receiving configuration information on candidate cells from the network device at the source side, when a candidate cell satisfies a condition for performing conditional handover, a target primary cell and target secondary cells are configured according to the configuration information. Hence, in a case where the UE may have multiple serving cells in conditional handover, configuration may be performed effectively on cells including target secondary cells. Thus, during the handover process, the target secondary cells may be configured for the UE as fast as possible, influence of the data transmission rate on the UE during the handover process may be reduced, and user experiences may be improved.

Embodiment 17

The embodiment of this disclosure provides a communications system, including a first network device, a second network device and the user equipment described in Embodiment 13. For example, reference may be made to FIG. 1 for a structure of the communications system. As shown in FIG. 1, the communications system 100 includes a first network device 101, a second network device 102 and a user equipment 103. The user equipment 103 is identical to those described in Embodiment 13, and repeated parts shall not be described herein any further. And furthermore, reference may be made to relevant techniques for the first network device 101 and the second network device 102.

It can be seen from the above embodiment that by transmitting the information on cells having best quality or indication of the information on cells having best quality to a network device at the target side when or after handover is completed, receiving the configuration information on target secondary cells from the second network device and configuring the target secondary cells according to the configuration information, in a case where the UE may have multiple serving cells in conditional handover, configuration may be performed effectively on cells including target secondary cells. Thus, during the handover process, the target secondary cells may be configured for the UE as fast as possible, influence of the data transmission rate on the UE during the handover process may be reduced, and user experiences may be improved.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 18 may either correspond to software modules of procedures of a computer program, or correspond to hardware modules. Such software modules may respectively correspond to the steps shown in FIG. 2. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of this disclosure containing the above embodiments, following supplements are further disclosed.

Supplement 1. A cell configuration apparatus, including:
a first receiving unit configured to receive configuration information on candidate cells from a first network device; and
a first configuring unit configured to, when a candidate cell satisfies a condition for performing conditional handover, configure a target primary cell (PCell) and target secondary cells (SCells) according to the configuration information.

Supplement 2. The apparatus according to claim 1, wherein,
the first receiving unit is configured to receive information on the candidate cells and the condition for performing conditional handover from the first network device.

Supplement 3. The apparatus according to supplement 2, wherein,
the first receiving unit includes:
a second receiving unit configured to receive, from the first network device, information on candidate primary cells and candidate secondary cells, a first condition for configuring a candidate primary cells as being the target primary cell and corresponding second conditions for configuring the candidate secondary cells as being the target secondary cells.

Supplement 4. The apparatus according to supplement 3, wherein,
the second conditions for configuring the candidate secondary cells as being the target secondary cells are commonly configured or respectively configured.

Supplement 5. The apparatus according to supplement 3, wherein,
the second conditions include at least one of the following:
quality measurement results of the candidate secondary cells being higher than or equal to a first predefined or preconfigured threshold;
the quality measurement results of the candidate secondary cells being higher than or equal to a quality measurement result of a primary cell or secondary cell that is serving currently, and a difference between the quality measurement results of the candidate secondary cells and the quality measurement result of a primary cell or secondary cell that is serving currently being higher than or equal to a second predefined or preconfigured threshold; and
the number of beams of the candidate secondary cells being higher than or equal to a third predefined or preconfigured threshold.

Supplement 6. The apparatus according to supplement 3, wherein,
the first configuring unit includes at least one of the following:
a second configuring unit configured to configure candidate secondary cells currently satisfying corresponding second conditions as being the target secondary cells, or configure candidate secondary cells currently satisfying corresponding second conditions of a predefined or preconfigured number as being the target secondary cells, when the candidate primary cell satisfies the first condition;
a third configuring unit configured to configure candidate secondary cells satisfying corresponding second conditions of a predefined or preconfigured number as being the target secondary cells, when the candidate primary cell satisfies the first condition and the second conditions of a predefined or preconfigured number satisfy the second conditions; and
a fourth configuring unit configured to, when the candidate primary cell satisfies the first condition and a predefined or preconfigured time is passed, configure candidate secondary cells satisfying corresponding second conditions after passing the predefined or preconfigured time.

Supplement 7. The apparatus according to supplement 2, wherein,
the first receiving unit includes:
a third receiving unit configured to receive, from the first network device, the information on the candidate cells, a third condition for configuring a candidate cell as being the target primary cell and fourth conditions for configuring the candidate cells as being the target secondary cells.

Supplement 8. The apparatus according to supplement 7, wherein,
the first configuring unit includes:
a fifth configuring unit configured to, when one of the candidate cells satisfies the third condition, configure the candidate cell satisfying the third condition as being the target primary cell.

Supplement 9. The apparatus according to supplement 7, wherein,
the first configuring unit includes at least one of the following:
a sixth configuring unit configured to, when at least two of the candidate cells satisfy the third condition, configure either one of the at least two candidate cells as being the target primary cell;
a seventh configuring unit configured to, when at least two of the candidate cells satisfy the third condition, configure one of the at least two candidate cells having a best quality measurement result as being the target primary cell;
an eighth configuring unit configured to, when at least two of the candidate cells satisfy the third condition, configure one of the at least two candidate cells having a highest priority as being the target primary cell, the priority being predefined or preconfigured; and
a ninth configuring unit configured to, when at least two of the candidate cells satisfy the third condition, configure one of the at least two candidate cells having a lowest load as being the target primary cell.

Supplement 10. The apparatus according to supplement 8 or 9, wherein,
the first configuring unit further includes at least one of the following:
a tenth configuring unit configured to configure other candidate cells satisfying the fourth conditions in the candidate cells than a candidate cell configured as being the target primary cell as being the target secondary cells;

an eleventh configuring unit configured to configure candidate cells in the other candidate cells having loads lower than a predefined or preconfigured fourth threshold as being the target secondary cells;

a twelfth configuring unit configured to configure candidate cells in the other candidate cells having quality measurement results higher than or equal to a fifth predefined or preconfigured threshold as being the target secondary cells; and a thirteenth configuring unit configured to configure candidate cells of a predefined or preconfigured number in the other candidate cells having best quality measurement results as being the target secondary cells.

Supplement 11. The apparatus according to any one of supplements 1-10, wherein the apparatus further includes:

a first transmitting unit configured to transmit information on the configured target secondary cells to a second network device.

Supplement 12. The apparatus according to supplement 11, wherein, the first transmitting unit is configured to, on the configured target primary cell, transmit the information on the configured target secondary cells to the second network device.

Supplement 13. The apparatus according to supplement 11, wherein, the information on the configured target secondary cells includes at least one of the following:

global cell identification (GCI), physical cell identification (PCI), absolute radio frequency channel numbers (ARFCNs), and cell indices, of the configured target secondary cells.

Supplement 14. A cell configuration apparatus, including:

a second transmitting unit configured to transmit information on cells having best quality or indication of the information on cells having best quality to a second network device when or after handover is completed;

a fourth receiving unit configured to receive configuration information on target secondary cells from the second network device; and a fourteenth configuring unit configured to configure the target secondary cells according to the configuration information.

Supplement 15. The apparatus according to supplement 14, wherein the second transmitting unit includes:

a third transmitting unit configured to transmit, in a handover complete message, the information on cells having best quality or the indication of the information on cells having best quality, to the second network device; or a fourth transmitting unit configured to transmit the information on cells having best quality or the indication of the information on cells having best quality to the second network device after the handover complete message is transmitted to the second network device.

Supplement 16. The apparatus according to supplement 14, wherein the apparatus further includes:

a fifth receiving unit configured to receive a request for transmitting the information on cells having best quality from the second network device; and a fifth transmitting unit configured to transmit the information on cells having best quality to the second network device.

Supplement 17. A cell configuration apparatus, including:

a sixth transmitting unit configured to transmit configuration information on candidate cells used for configuring a target primary cell and target secondary cells to a first network device.

Supplement 18. The apparatus according to supplement 17, wherein, the sixth transmitting unit includes:

a seventh transmitting unit configured to transmit information on candidate primary cells and candidate secondary cells to the first network device; or an eighth transmitting unit configured to transmit the information on candidate primary cells and candidate secondary cells, a first condition for configuring a candidate primary cell as being the target primary cell and corresponding second conditions for configuring the candidate secondary cells as being target secondary cells, to the first network device.

Supplement 19. The apparatus according to supplement 17, wherein, the sixth transmitting unit includes:

a ninth transmitting unit configured to transmit information on candidate cells to the first network device; or a tenth transmitting unit configured to transmit the information on candidate cells, a third condition for configuring a candidate cell as being the target primary cell and fourth conditions for configuring the candidate cells as being the target secondary cells, to the first network device.

Supplement 20. A cell configuration apparatus, including:

an eleventh transmitting unit configured to transmit configuration information on candidate cells used for configuring a target primary cell and target secondary cells.

Supplement 21. The apparatus according to supplement 20, wherein the apparatus further includes:

a sixth receiving unit configured to receive information on candidate primary cell and candidate secondary cells, a first condition for configuring the candidate primary cell as being a target primary cell and corresponding second conditions for configuring the candidate secondary cells as being target secondary cells, from a second network device;

and the eleventh transmitting unit is configured to transmit the information on candidate primary cells and candidate secondary cells, the first condition for configuring the candidate primary cell as being a target primary cell and the corresponding second conditions for configuring the candidate secondary cells as being target secondary cells, to UE.

Supplement 22. The apparatus according to supplement 20, wherein the apparatus further includes:

a seventh receiving unit configured to receive the information on candidate primary cells and candidate secondary cells from a second network device;

and the eleventh transmitting unit is configured to transmit the information on candidate primary cells and candidate secondary cells, the first condition for configuring the candidate primary cell as being a target primary cell and the corresponding second conditions for configuring the candidate secondary cells as being target secondary cells, to the UE.

Supplement 23. The apparatus according to supplement 20, wherein the apparatus further includes:

an eighth receiving unit configured to receive information on candidate cells, a third condition for configuring a candidate cell as being the target primary cell and fourth conditions for configuring the candidate cells as being the target secondary cells from the second network device;

and the eleventh transmitting unit is configured to transmit the information on candidate cells, the third condition for configuring a candidate cell as being the target primary cell and the fourth conditions for configuring the candidate cells as being the target secondary cells, to the UE.

Supplement 24. The apparatus according to supplement 20, wherein the apparatus further includes:

a ninth receiving unit configured to receive the information on candidate cells from the second network device;

and the eleventh transmitting unit is configured to transmit the information on candidate cells, the third condition for configuring a candidate cell as being the target primary cell and the fourth conditions for configuring the candidate cells as being the target secondary cells, to the UE.

Supplement 25. A UE, including the apparatus as described in any one of supplements 1-16.

Supplement 26. A network device, including the apparatus as described in any one of supplements 17-24.

Supplement 27. A communications system, including:

a UE, including the apparatus as described in any one of supplements 1-16; and/or a first network device, including the apparatus as described in any one of supplements 17-19; and a second network device, including the apparatus as described in any one of supplements 20-24.

Supplement 28. A cell configuration method, including:

receiving configuration information on candidate cells from a first network device; and when a candidate cell satisfies a condition for performing conditional handover, configuring a target primary cell (PCell) and target secondary cells (SCells) according to the configuration information.

Supplement 29. The method according to claim 28, wherein, the receiving configuration information on candidate cells from a first network device includes:

receiving information on the candidate cells and the condition for performing conditional handover from the first network device.

Supplement 30. The method according to supplement 29, wherein, the receiving information on the candidate cells and the condition for performing conditional handover from the first network device includes:

receiving, from the first network device, information on candidate primary cells and candidate secondary cells, a first condition for configuring a candidate primary cell as being the target primary cell and corresponding second conditions for configuring the candidate secondary cells as being the target secondary cells.

Supplement 31. The method according to supplement 30, wherein, the second conditions for configuring the candidate secondary cells as being the target secondary cells are commonly configured or respectively configured.

Supplement 32. The method according to supplement 30, wherein, the second conditions include at least one of the following:

quality measurement results of the candidate secondary cells being higher than or equal to a first predefined or preconfigured threshold;

the quality measurement results of the candidate secondary cells being higher than or equal to a quality measurement result of a primary cell or secondary cell that is serving currently, and a difference between the quality measurement results of the candidate secondary cells and the quality measurement result of a primary cell or secondary cell that is serving currently being higher than or equal to a second predefined or preconfigured threshold; and the number of beams of the candidate secondary cells being higher than or equal to a third predefined or preconfigured threshold.

Supplement 33. The method according to supplement 30, wherein, when a candidate cell satisfies the condition for performing conditional handover, the configuring a target primary cell and target secondary cells according to the configuration information includes at least one of the following:

when the candidate primary cell satisfies the first condition, configuring candidate secondary cells currently satisfying corresponding second conditions as being the target secondary cells, or configuring candidate secondary cells currently satisfying corresponding second conditions of a predefined or preconfigured number as being the target secondary cells;

when the candidate primary cell satisfies the first condition and the second conditions of a predefined or preconfigured number satisfy the second conditions, configuring candidate secondary cells satisfying corresponding second conditions of a predefined or preconfigured number as being the target secondary cells; and when the candidate primary cell satisfies the first condition and a predefined or preconfigured time is passed, configuring candidate secondary cells satisfying corresponding second conditions after passing the predefined or preconfigured time.

Supplement 34. The method according to supplement 29, wherein, the receiving information on the candidate cells and the condition for performing conditional handover from the first network device includes:

receiving, from the first network device, the information on the candidate cells, a third condition for configuring a candidate cell as being the target primary cell and fourth conditions for configuring the candidate cells as being the target secondary cells.

Supplement 35. The method according to supplement 34, wherein, when a candidate cell satisfies the condition for performing conditional handover, the configuring a target primary cell and target secondary cells according to the configuration information includes:

when one of the candidate cells satisfies the third condition, configuring the candidate cell satisfying the third condition as being the target primary cell.

Supplement 36. The method according to supplement 34, wherein, when the candidate cells satisfy the condition for performing conditional handover, the configuring a target primary cell and target secondary cells according to the configuration information includes at least one of the following:

when at least two of the candidate cells satisfy the third condition, configuring either one of the at least two candidate cells as being the target primary cell;

when at least two of the candidate cells satisfy the third condition, configuring one of the at least two candidate cells having a best quality measurement result as being the target primary cell;

when at least two of the candidate cells satisfy the third condition, configuring one of the at least two candidate cells having a highest priority as being the target primary cell, the priority being predefined or preconfigured; and when at least two of the candidate cells satisfy the third condition, configuring one of the at least two candidate cells having a lowest load as being the target primary cell.

Supplement 37. The method according to supplement 35 or 36, wherein, when a candidate cell satisfies the condition for performing conditional handover, the configuring a target primary cell and target secondary cells according to the configuration information further includes at least one of the following:

configuring other candidate cells satisfying the fourth conditions in the candidate cells than a candidate cell configured as being the target primary cell as being the target secondary cells;

configuring candidate cells in the other candidate cells having loads lower than a predefined or preconfigured fourth threshold as being the target secondary cells;

configuring candidate cells in the other candidate cells having quality measurement results higher than or equal to a fifth predefined or preconfigured threshold as being the target secondary cells; and configuring candidate cells of a predefined or preconfigured number in the other candidate cells having best quality measurement results as being the target secondary cells.

Supplement 38. The method according to any one of supplements 28-37, wherein the method further includes:

transmitting information on the configured target secondary cells to a second network device.

Supplement 39. The method according to supplement 38, wherein, the transmitting information on the configured target secondary cells to a second network device includes:

on the configured target primary cell, transmitting the information on the configured target secondary cells to the second network device.

Supplement 40. The method according to supplement 38, wherein, the information on the configured target secondary cells includes at least one of the following:

global cell identification (GCI), physical cell identification (PCI), absolute radio frequency channel numbers (ARFCNs), and cell indices, of the configured target secondary cells.

Supplement 41. A cell configuration method, including:

transmitting information on cells having best quality or indication of the information on cells having best quality to a second network device when or after handover is completed;

receiving configuration information on target secondary cells from the second network device; and configuring the target secondary cells according to the configuration information.

Supplement 42. The method according to supplement 41, wherein the transmitting information on cells having best quality to a second network device when or after handover is completed includes:

in a handover complete message, transmitting the information on cells having best quality or the indication of the information on cells having best quality to the second network device; or transmitting the information on cells having best quality or the indication of the information on cells having best quality to the second network device after the handover complete message is transmitted to the second network device.

Supplement 43. The method according to supplement 41, wherein the method further includes:

receiving a request for transmitting the information on cells having best quality from the second network device; and transmitting the information on cells having best quality to the second network device.

Supplement 44. A cell configuration method, including:

transmitting configuration information on candidate cells used for configuring a target primary cell and target secondary cells to a first network device.

Supplement 45. The method according to supplement 44, wherein, the transmitting configuration information on candidate cells used for configuring a target primary cell and target secondary cells to a first network device includes:

transmitting information on candidate primary cells and candidate secondary cells to the first network device; or transmitting the information on candidate primary cells and candidate secondary cells, a first condition for configuring the candidate primary cells as being a target primary cell and corresponding second conditions for configuring the candidate secondary cells as being target secondary cells, to the first network device.

Supplement 46. The method according to supplement 44, wherein, the transmitting configuration information on candidate cells used for configuring a target primary cell and target secondary cells to a first network device includes:

transmitting information on candidate cells to the first network device; or transmitting the information on candidate cells, a third condition for configuring a candidate cell as being the target primary cell and fourth conditions for configuring the candidate cells as being the target secondary cells, to the first network device.

Supplement 47. A cell configuration method, including:

transmitting configuration information on candidate cells used for configuring a target primary cell and target secondary cells to a UE.

Supplement 48. The method according to supplement 47, wherein the method further includes:

receiving information on candidate primary cell and candidate secondary cells, a first condition for configuring the candidate primary cell as being a target primary cell and corresponding second conditions for configuring the candidate secondary cells as being target secondary cells, from a second network device;

and the transmitting configuration information on candidate cells used for configuring a target primary cell and target secondary cells to a UE includes:

transmitting the information on candidate primary cells and candidate secondary cells, the first condition for configuring the candidate primary cell as being a target primary cell and the corresponding second conditions for configuring the candidate secondary cells as being target secondary cells, to the UE.

Supplement 49. The method according to supplement 47, wherein the method further includes:

receiving the information on candidate primary cells and candidate secondary cells from a second network device;

and the transmitting configuration information on candidate cells used for configuring a target primary cell and target secondary cells to a UE includes:

transmitting the information on candidate primary cells and candidate secondary cells, the first condition for configuring the candidate primary cell as being a target primary cell and the second conditions for configuring the candidate secondary cells as being target secondary cells, to the UE.

Supplement 50. The method according to supplement 47, wherein the method further includes:

receiving information on candidate cells, a third condition for configuring a candidate cell as being the target primary cell and fourth conditions for configuring the candidate cells as being the target secondary cells from the second network device;

and the transmitting configuration information on candidate cells used for configuring a target primary cell and target secondary cells to a UE includes:

transmitting the information on candidate cells, the third condition for configuring a candidate cell as being the target primary cell and the fourth conditions for configuring the candidate cells as being the target secondary cells, to the UE.

Supplement 51. The method according to supplement 47, wherein the method further includes:

receiving the information on candidate cells from the second network device;

and the transmitting configuration information on candidate cells used for configuring a target primary cell and target secondary cells to a UE includes:

transmitting the information on candidate cells, the third condition for configuring a candidate cell as being the target primary cell and the fourth conditions for configuring the candidate cells as being the target secondary cells, to the UE.

What is claimed is:

1. A cell configuration apparatus, configured in a user equipment, comprising:
   a receiver configured to receive configuration information including a condition for performing conditional handover from a source base station to a target base station, wherein the condition comprises a first condition that a first candidate cell corresponding to a target primary cell is configured to be e target primary cell; and
   processor circuitry configured to: when the first candidate cell satisfies the first condition,
   according to the configuration information, configure the first candidate cell to be the target primary cell, and a second candidate to be a secondary cell,
   wherein the configuration information further includes:
   first information on the first candidate cell; and
   second information on the second candidate cell(s) that corresponds to the target secondary cell(s), and
   wherein the first information on the first candidate cell includes at least one of Global Cell Identifiers (GCIs), physical cell identifiers (PCIs), absolute radio frequency channel numbers (ARFCNs) and cell indices, of the first candidate cell, and the second information on the second candidate cell(s) includes at least one of Global Cell Identifiers (GCIs), physical cell identifiers (PCIs), absolute radio frequency channel numbers (ARFCNs) and cell indices, of the second candidate cell(s).

2. The apparatus according to claim 1, wherein, the receiver is further configured to receive the condition for performing conditional handover from a first network device at a source side.

3. The apparatus according to claim 1, wherein, the configuration information comprises:
   one or more of information on candidate primary cells, information on candidate secondary cells, the first condition and one of second conditions for configuring the candidate secondary cells as being the target secondary cells.

4. The apparatus according to claim 3, wherein, the second conditions for configuring the candidate secondary cells as being the target secondary cells are commonly configured or respectively configured.

5. The apparatus according to claim 3, wherein, the second conditions comprise at least one of the following:
   quality measurement results of the candidate secondary cells being higher than or equal to a first predefined or preconfigured threshold;
   the quality measurement results of the candidate secondary cells being higher than or equal to a quality measurement result of a primary cell or secondary cell that is serving currently, and a difference between the quality measurement results of the candidate secondary cells and the quality measurement result of a primary cell or secondary cell that is serving currently being higher than or equal to a second predefined or preconfigured threshold; and
   the number of beams of the candidate secondary cells being higher than or equal to a third predefined or preconfigured threshold.

6. The apparatus according to claim 3, wherein, the processor circuitry is further configured to:
   configure candidate secondary cells currently satisfying corresponding second conditions as being the target secondary cells, or configure candidate secondary cells currently satisfying corresponding second conditions of a predefined or preconfigured number as being the target secondary cells, when the candidate primary cell satisfies the first condition;
   configure candidate secondary cells satisfying corresponding second conditions of a predefined or preconfigured number as being the target secondary cells, when the candidate primary cell satisfies the first condition and the second conditions of a predefined or preconfigured number satisfy the second conditions; or
   configure, when the candidate primary cell satisfies the first condition and a predefined or preconfigured time is passed, candidate secondary cells satisfying corresponding second conditions after passing the predefined or preconfigured time.

7. The apparatus according to claim 2, wherein, the receiver is further configured to:
   receive, from the first network device, the information on the candidate cells, a third condition for configuring a candidate cell as being the target primary cell and fourth conditions for configuring the candidate cells as being the target secondary cells.

8. The apparatus according to claim 7, wherein, the processor circuitry is further configured to:
   when one of the candidate cells satisfies the third condition, configure the candidate cell satisfying the third condition as being the target primary cell.

9. The apparatus according to claim 8, wherein, the processor circuitry is further configured to:
   configure other candidate cells satisfying the fourth conditions in the candidate cells than a candidate cell configured as being the target primary cell as being the target secondary cells;
   configure candidate cells in the other candidate cells having loads lower than a predefined or preconfigured fourth threshold as being the target secondary cells;
   configure candidate cells in the other candidate cells having quality measurement results higher than or equal to a fifth predefined or preconfigured threshold as being the target secondary cells; or configure candidate cells of a predefined or preconfigured number in the other candidate cells having best quality measurement results as being the target secondary cells.

10. The apparatus according to claim 7, wherein,
the processor circuitry is further configured to:
configure, when at least two of the candidate cells satisfy the third condition, either one of the at least two candidate cells as being the target primary cell;
configure, when at least two of the candidate cells satisfy the third condition, one of the at least two candidate cells having a best quality measurement result as being the target primary cell;
configure, when at least two of the candidate cells satisfy the third condition, one of the at least two candidate cells having a highest priority as being the target primary cell, the priority being predefined or preconfigured; or
configure, when at least two of the candidate cells satisfy the third condition, one of the at least two candidate cells having a lowest load as being the target primary cell.

11. The apparatus according to claim 1, wherein the apparatus further comprises:
a transmitter configured to transmit information on the configured target secondary cells to a second network device.

12. The apparatus according to claim 11, wherein,
the transmitter is configured to, on the configured target primary cell, transmit the information on the configured target secondary cells to the second network device.

13. The apparatus according to claim 11, wherein,
the information on the configured target secondary cells comprises at least one of the following:
global cell identification (GCI), physical cell identification (PCI), absolute radio frequency channel numbers (ARFCNs), and cell indices, of the configured target secondary cells.

14. The cell configuration apparatus according to claim 1, wherein
the processor circuitry is further configured to control, using the target primary cell and the target secondary cell, a communication with the target base station after the conditional handover.

15. A cell configuration apparatus, configured in a second network device at a target side, comprising:
a memory that stores a plurality of instructions;
processor circuitry that couples to the memory and is configured to execute the plurality of instructions to:
transmit configuration information including a condition for performing conditional handover by user equipment from a source base station to a target base station, wherein the condition comprises a first condition that a first candidate cell corresponding to a target primary cell is configured to be the target primary cell,
when the first candidate cell satisfies the first condition, according to the configuration information,
the first candidate cell is configured to be the target primary cell, and
a second candidate cell is configured to be a target secondary cell,
wherein the configuration information further includes:
first information on the first candidate cell that corresponds to the target primary cell; and
second information on the second candidate cell(s) that corresponds to the target secondary cell(s), and
wherein the first information on the first candidate cell includes at least one of Global Cell Identifiers (GCIs), physical cell identifiers (PCIs), absolute radio frequency channel numbers (ARFCNs) and cell indices, of the first candidate cell, and the second information on the second candidate cell(s) includes at least one of Global Cell Identifiers (GCIs), physical cell identifiers (PCIs), absolute radio frequency channel numbers (ARFCNs) and cell indices, of the second candidate cell(s).

\* \* \* \* \*